(12) United States Patent
Oguchi et al.

(10) Patent No.: US 9,767,364 B2
(45) Date of Patent: Sep. 19, 2017

(54) FOOTAGE EXTRACTION METHOD, FOOTAGE PLAYBACK METHOD, AND DEVICE

(71) Applicant: FUJITSU LIMITED, Kawasaki-shi, Kanagawa (JP)

(72) Inventors: Atsushi Oguchi, Kawasaki (JP); Miho Sakai, Yokohama (JP); Shuichi Horiuchi, Ohta (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/721,087

(22) Filed: May 26, 2015

(65) Prior Publication Data

US 2015/0356355 A1    Dec. 10, 2015

(30) Foreign Application Priority Data

Jun. 9, 2014   (JP) ................. 2014-119046

(51) Int. Cl.
| | |
|---|---|
| *G11B 27/32* | (2006.01) |
| *G06K 9/00* | (2006.01) |
| *G06F 17/30* | (2006.01) |
| *G11B 27/10* | (2006.01) |

(52) U.S. Cl.
CPC ..... *G06K 9/00744* (2013.01); *G06F 17/3079* (2013.01); *G06K 9/00724* (2013.01); *G11B 27/105* (2013.01); *G11B 27/322* (2013.01)

(58) Field of Classification Search
None
See application file for complete search history.

(56) References Cited

U.S. PATENT DOCUMENTS

| 6,606,636 | B1 | 8/2003 | Okazaki et al. |
| 2001/0014973 | A1 | 8/2001 | Suzuki |
| 2001/0016847 | A1 | 8/2001 | Suzuki |
| 2001/0044333 | A1* | 11/2001 | Okishio ............... A63F 13/10 463/3 |
| 2006/0003830 | A1* | 1/2006 | Walker ............... G06Q 10/063 463/20 |

(Continued)

FOREIGN PATENT DOCUMENTS

| JP | 2001-186471 A | 7/2001 |
| JP | 2001-229195 | 8/2001 |

(Continued)

OTHER PUBLICATIONS

Korean Office Action mailed Feb. 15, 2016 for corresponding Korean Patent Application No. 10-2015-0076207, with English Translation, 16 pages.

(Continued)

*Primary Examiner* — Eileen Adams
(74) *Attorney, Agent, or Firm* — Fujitsu Patent Center

(57) ABSTRACT

A footage extraction device includes a processor that executes a process. The process includes receiving a designation including a particular ball count status and a ball count change trend from an initial status of a ball count to the particular ball count status, and, by the processor, extracting, from stored baseball footage, footage with a ball count status that is attained after the ball count status has changed according to the designated ball count change trend, and that corresponds to the designated particular ball count status.

21 Claims, 20 Drawing Sheets

(56) References Cited

U.S. PATENT DOCUMENTS

| | | | |
|---|---|---|---|
| 2008/0175486 A1 | 7/2008 | Yamamoto | |
| 2012/0214575 A1* | 8/2012 | Amaitis | G06Q 50/34 463/25 |
| 2012/0237182 A1* | 9/2012 | Eyer | H04N 5/783 386/241 |
| 2015/0262616 A1* | 9/2015 | Jaime | G11B 27/034 386/228 |

FOREIGN PATENT DOCUMENTS

| | | |
|---|---|---|
| JP | 2001-230994 A | 8/2001 |
| JP | 2008-176538 A | 7/2008 |
| JP | 2009-194598 A | 8/2009 |
| JP | 2011-103617 A | 5/2011 |
| KR | 10-2008-0035892 A | 4/2008 |

OTHER PUBLICATIONS

Taiwanese Office Action mailed Oct. 4, 2016 for corresponding Taiwanese Patent Application No. 104117192, with Partial English Translation, 24, pages.

Japanese Office Action dated May 25,2017 for corresponding Taiwanese Patent Application No. 104117192, with English Translation, 11 pages.

Office Action (TWOA) dated May 25, 2017, by the Taiwan (TW) Intellectual Property Office, in connection with corresponding TW Patent Application No. 104117192, with English Translation, 11 pages.

* cited by examiner

FIG.2

Table 26:

| PITCHER ID | PLAYER NAME | TEAM | LEFT/RIGHT |
|---|---|---|---|
| 12011 | JIRO TANAKA | TEAM B | RIGHT-HANDED PITCHER |
| ... | ... | ... | ... |

Table 25:

| BATTER ID | PLAYER NAME | TEAM |
|---|---|---|
| 10001 | TARO YAMADA | TEAM A |
| ... | ... | ... |

Table 23:

| FRAME TIME | TURN AT BAT ID | BATTER ID | PITCHER ID | TURN AT BAT OUTCOME | SCORE | BASES GAINED | ADVANTAGE INFORMATION | BATTING ORDER | BATTING AVERAGE | OUTCOME DETAILS | BOOKMARKED |
|---|---|---|---|---|---|---|---|---|---|---|---|
| 10:20:15 | 14 | 10001 | 12011 | INFIELD GROUNDER | N | Y | STRIKE ADVANTAGE | 2 | .283 | SECOND GROUND | 002, 003 |
| 10:22:32 | 15 | 10002 | 12011 | OUTFIELD FLY | N | N | NONE | 3 | .333 | RIGHT FLY | 014 |
| ... | ... | ... | ... | ... | ... | ... | ... | ... | ... | ... | ... |

Table 24:

| FRAME TIME | TURN AT BAT ID | BALL COUNT | STRIKE COUNT | OUT COUNT | RUNNERS | SCORE SITUATION | PITCH OUTCOME | BOOKMARKED |
|---|---|---|---|---|---|---|---|---|
| 10:21:55 | 15 | 1 | 1 | 0 | 1, 2 | LEADING | STRIKE | |
| 10:22:32 | 15 | 1 | 2 | 0 | 1, 2 | LEADING | BALL | 001 |
| ... | ... | ... | ... | ... | ... | ... | ... | ... |

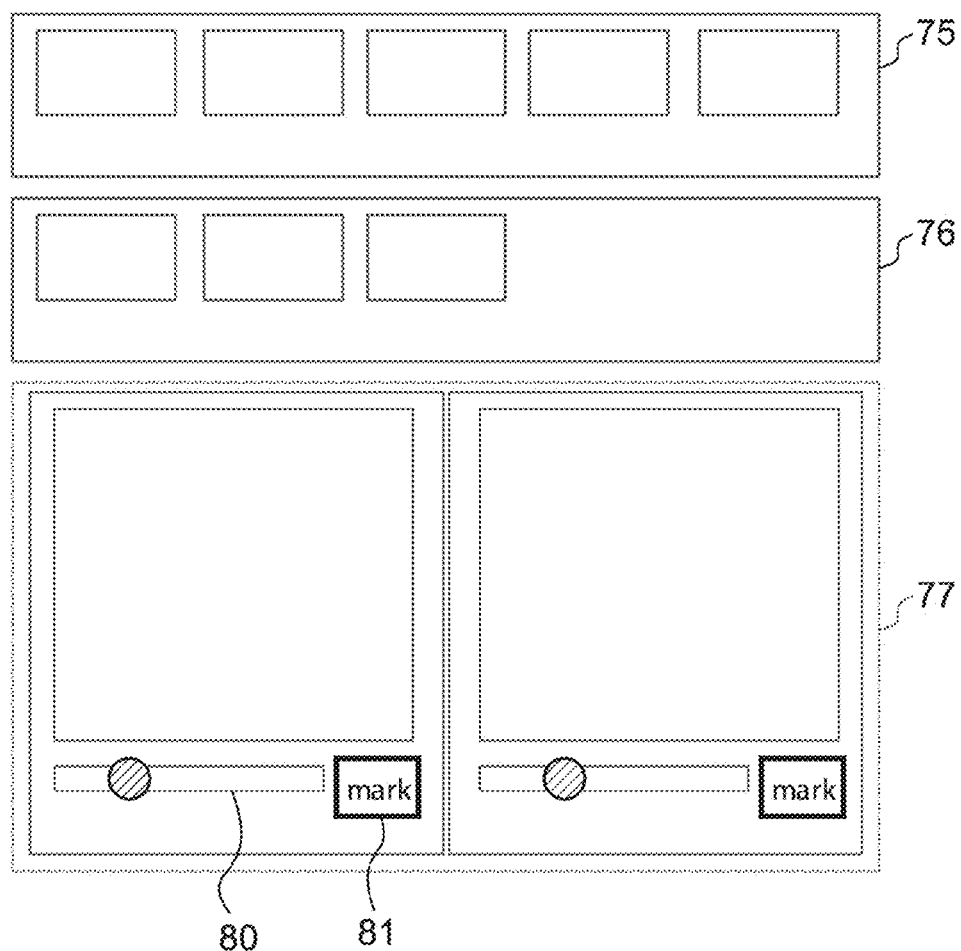

FOOTAGE EXTRACTION METHOD, FOOTAGE PLAYBACK METHOD, AND DEVICE

CROSS-REFERENCE TO RELATED APPLICATION

This application is based upon and claims the benefit of priority of the prior Japanese Patent Application, No. 2014-119046, filed on Jun. 9, 2014, the entire content of which is incorporated herein by reference.

FIELD

The embodiments discussed herein are related to a footage extraction method, a recording medium storing a footage extraction program, a footage extraction device, a footage playback method, a recording medium storing a footage playback program, a footage playback device, and a footage playback control device.

BACKGROUND

Footage data processing systems have been proposed in which footage of a desired scene is extracted from a large amount of footage data. For example, footage data split into chronological segments for desired individual scenes of a subject (in the case of a baseball game, for example individual units of a single pitch), and various search data corresponding thereto, are pre-stored associated with each other in a database. Technology has been proposed for extracting the desired footage data from the database.
Related Patent Documents
Japanese Laid-open Patent Publication No.2001-229195

SUMMARY

According to an aspect of the embodiments, a footage extraction method includes: receiving a designation including a particular ball count status and a ball count change trend from an initial status of a ball count to the particular ball count status; and, by a processor, extracting, from stored baseball footage, footage with a ball count status that is attained after the ball count status has changed according to the designated ball count change trend, and that corresponds to the designated particular ball count status.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of a metadata database;
FIG. 23 is a drawing to explain playback timing control for two pieces of footage.

DESCRIPTION OF EMBODIMENTS

Detailed explanation follows regarding an example of an exemplary embodiment according to technology disclosed herein.

Figure 1:
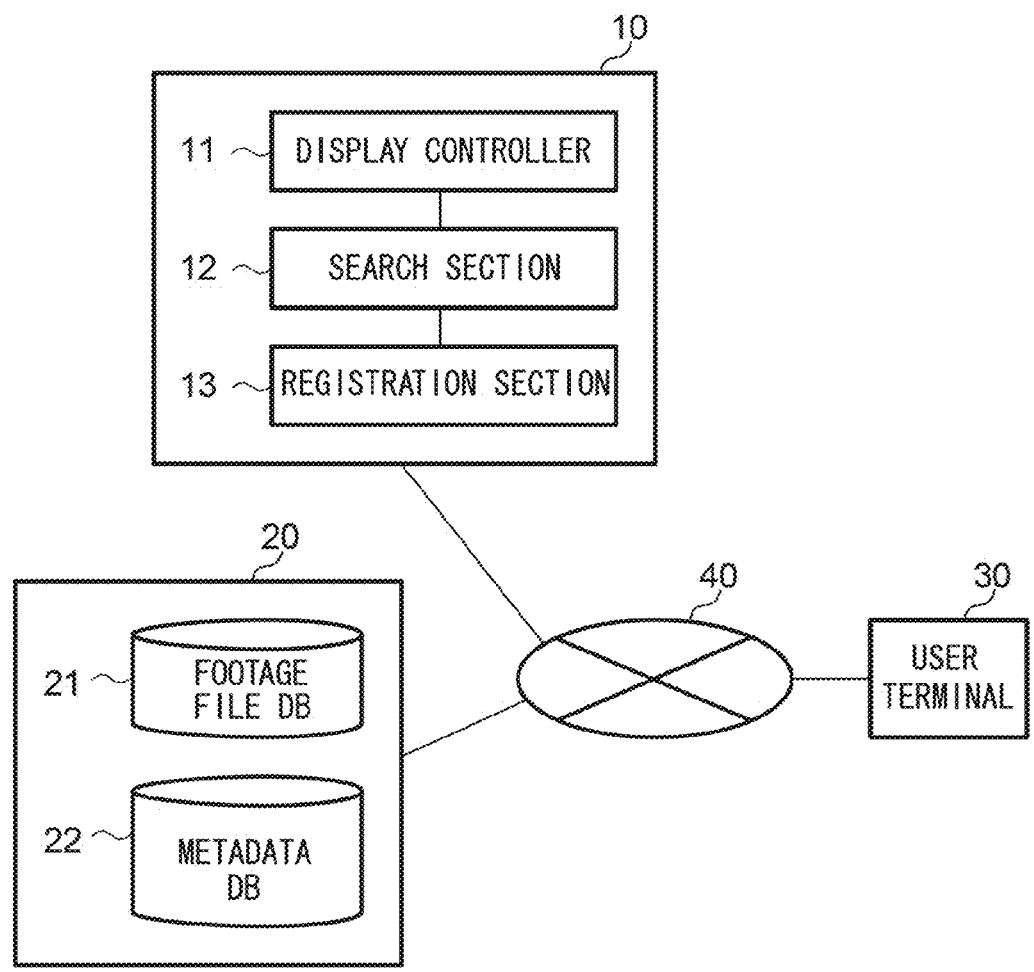
FIG. 1 is a functional block diagram of a footage provision device according to an exemplary embodiment.

As illustrated in FIG. 1, a footage provision device 10 according to the present exemplary embodiment is connected to a storage device 20 and a user terminal 30 through a network 40.

The user terminal 30 is a device including a display section to display footage, and an input section for inputting information, and is, for example, a personal computer (PC), a notebook PC, a tablet terminal, a smartphone, or the like.

Based on search conditions designated by the user, the footage provision device 10 searches for user-requested footage from a footage file stored in the storage device 20, and provides the footage to the user terminal 30.

As illustrated in FIG. 1, the storage device 20 is stored with a footage file database (DB) 21, and a metadata DB 22. In the present exemplary embodiment, the footage file DB 21 is stored with plural footage files representing captured footage of baseball games, with footage of each game stored as a single footage file. The footage represented by each footage file is, for example, footage captured at a frame rate of 30 fps, 60 fps, or the like, and includes plural frames. Each frame is associated with a frame time expressing the elapsed time from the start of the captured footage.

The metadata DB 22 stores metadata corresponding to each footage file. As illustrated in FIG. 2, the metadata DB 22 for each footage file includes a turn at batturn at bat data table 23, a pitch data table 24, a batter data table 25, and a pitcher data table 26.

In the turn at batturn at bat data table 23, information representing the outcome of the turn at batturn at bat, and a situation during the turn at batturn at bat, is associated with footage corresponding to an individual turn at batturn at bat extracted from the footage represented by the respective footage file. Specifically, as illustrated in FIG. 2, in the turn at batturn at bat data table 23, respective metadata may be associated with respective frame times of frames representing the boundaries of footage of an individual turn at batturn at bat, for example a start frame and an end frame out of a group of frames representing footage of the individual turn at batturn at bat.

In the example of FIG. 2, the turn at batturn at bat data table 23 includes the items "frame time", "turn at batturn at bat ID", "batter ID", "pitcher ID", "turn at batturn at bat outcome", "score", "bases gained", "advantage information", "batting order", "batting average", and "outcome details", with each record (each row) corresponding to a single turn at batturn at bat.

As described above, "frame time" is a frame time of the respective start frame or end frame of the group of frames representing footage of an individual turn at batturn at bat. Note that in the example of FIG. 2, only the frame time of the start frame is illustrated under "frame time", and the frame time of the end frame is not illustrated. "Turn at batTurn at bat ID" is identification information identifying the turn at batturn at bat. "Batter ID" is identification information identifying the batter during the turn at bat. "Pitcher ID" is identification information identifying the pitcher of the opposing team during the turn at bat. "Turn at bat outcome" is information regarding the ultimate outcome of the turn at bat, for example, a single, a double, a triple, a homerun, an infield grounder, an infield fly, an outfield fly, strike-out, a sacrifice fly, a sacrifice bunt, or the like. "Score" is information representing whether or not any points were gained at that turn at bat. In the example of FIG. 2, this is represented by Y when points are gained (not illustrated in the example of FIG. 2), and by N when points are not gained.

"Bases gained" is information representing whether or not a runner gained any bases in that turn at bat, regardless of whether the turn at bat outcome of the turn at bat was safe or out. In the example illustrated in FIG. 2, this is represented by Y when bases were gained, and by N when bases were not gained. "Advantage information" is information representing whether the pitcher's pitches in that turn at bat since the start of the turn at bat have strike advantage, or ball advantage. Namely, "advantage information" is information representing the trend of change in the ball count from an initial status of the ball count until a given ball count status. For example, advantage information may be "strike advantage" when the first and second pitches delivered by the pitcher were consecutive strikes, "ball advantage" when the first and second pitches delivered by the pitcher were consecutive balls, and "none" when neither case applies. "Batting order" is information representing the batting order of the batter at the turn at bat. "Batting average" is information representing the batting average of the batter at the time of the turn at bat.

Note that the criteria for advantage of strikes and balls described above are merely examples of criteria for advantage, and there is no limitation to the above configuration. For example, the higher count out of strikes and balls from the start of a turn at bat until the third pitch may be awarded as the advantage. Moreover, when the total number of pitches in a turn at bat is one or two pitches, strike advantage may be awarded when the first pitch was a strike, and ball advantage may be awarded when the first pitch was a ball. Moreover, configuration may be made such that neither strike advantage nor ball advantage is awarded when the total number of pitches in a turn at bat is a low number of pitches, such as one or two pitches. It is conceivable that searching using the advantage information as a condition may be particularly useful when the count is 2-2 (representing 2 strikes against 2 balls), or the count is 2-3 (representing 2 strikes against 3 balls). Configuration may therefore be made to only accept designated advantage information (display a screen allowing advantage information to be designated) for ball counts designated as a count of 2-2 or a count of 2-3.

"Outcome details" is information representing details of the turn at bat outcome, for example, grounder to second or right fly ball, in text data. For example, when more detailed text data, such as "a right fly ball hit straight to the outside from a count of 2-1", can be acquired, such detailed text data may be employed as metadata of "outcome details".

In the pitch data table 24, information representing the outcome of the pitch, and the situation during the pitch, is associated with footage corresponding to a pitcher's individual pitch extracted from the footage represented by the respective footage file. Specifically, as illustrated in FIG. 2, in the pitch data table 24, respective metadata may be associated with respective frame times of frames representing the boundaries of footage of an individual pitch, for example a start frame and an end frame out of a group of frames representing footage of the individual pitch.

In the example of FIG. 2, the pitch data table 24 includes the items "frame time", "turn at bat ID", "ball count", "strike count", "out count", "runners", "state of score", and "pitch outcome", with each record (each row) corresponding to a single pitch.

As described above, "frame time" is a frame time of a respective start frame or end frame of the group of frames representing footage of an individual pitch. "Turn at bat ID" corresponds to the turn at bat ID of the turn at bat data table 23. Namely, each pitch showing a record appended with the same turn at bat ID in the pitch data table 24 represents a pitch from the same turn at bat. "Ball count", "strike count", "out count", "runners", and "score situation" respectively represent the ball count, strike count, out count, runner, and the score situation at the start point of that pitch. "Runners" is information representing which bases are occupied by runners. "Score situation" is information representing whether the team (the team of the batter) is in the lead, or is behind. "Pitch outcome" is information representing whether the outcome of the pitch was a strike or a ball. Note that the "pitch outcome" for the record representing the final pitch of each respective turn at bat is the same as the "turn at bat outcome" of the record representing the turn at bat including that pitch.

The batter data table 25 is stored with information corresponding to the "batter ID" of the turn at bat data table 23. In the example of FIG. 2, the batter data table 25 includes the items "batter ID", "player name", and "team". "Player name" is information representing the name of the batter identified by the batter ID. "Team" is information representing the team to which the batter identified by the batter ID belongs.

The pitcher data table 26 is stored with information corresponding to the "pitcher ID" of the turn at bat data table 23. In the example of FIG. 2, the pitcher data table 26 includes the items "pitcher ID", "player name", and "team", and "left/right". "Player name" is information representing the name of pitcher identified by the pitcher ID. "Team" is information representing the team to which the pitcher identified by the pitcher ID belongs. "Left/right" is information representing whether the pitcher identified by the pitcher ID is a left-handed pitcher (left-handed throw) or a right-handed pitcher (right-handed throw).

In addition to the metadata relating to the footage of each turn at bat or each pitch, the turn at bat data table 23 and the pitch data table 24 are also respectively stored with information relating to footage registered as bookmarked footage under a "bookmarked" item. Specifically, the "bookmarked" item is registered with a user ID of a user who has selected, as bookmarked footage, footage of an individual turn at bat, or footage of an individual pitch, represented by a record in the turn at bat data table 23 or the pitch data table 24 respectively. The "bookmarked" item for a record relating to footage that has been registered as bookmarked footage by plural users stores the user IDs of all of these users. Note that the user ID is acquired by, for example, requesting that the user logs in using a user ID when using the footage provision device 10.

As illustrated in FIG. 1, the footage provision device 10 includes a display controller 11, a search section 12, and a registration section 13.

Figure 3:
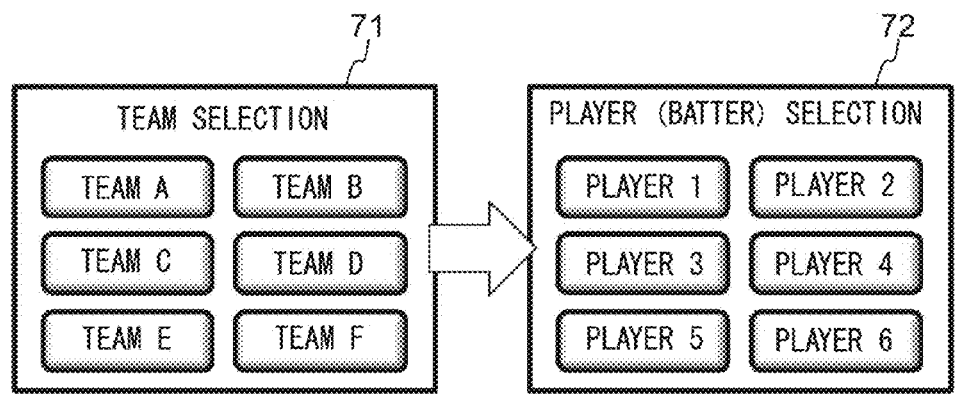
FIG. 3 is a drawing illustrating an example of a team selection screen and a player selection screen.

The display controller 11 controls to display, for example, a team selection screen 71 such as that illustrated on the left in FIG. 3 on the display section of the user terminal 30 when an application for receiving provided footage from the footage provision device 10 is started up on the user terminal 30. The team selection screen 71 is a screen displayed in a state that allows the user to select the team of a batter for whom user wish to search for footage.

Figure 4:
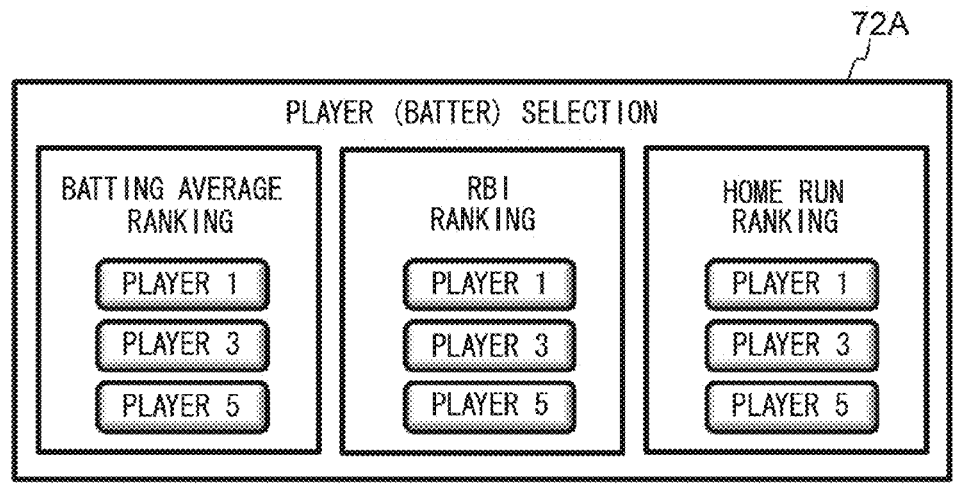
FIG. 4 is a drawing illustrating another example of a player selection screen.

The display controller 11 also controls to display, for example, a player selection screen 72 such as that illustrated on the right in FIG. 3 on the display section of the user terminal 30 when the user has selected a team on the team selection screen 71. The player selection screen 72 is a screen displayed in a state that allows the user to select a player for whom user wish to search for footage. Note that player selection is not limited to being performed after selecting the team as in FIG. 3. It is sufficient that a player for whom the user wishes to search for footage can be designated, for example by displaying a player selection screen 72A allowing a player to be selected by batting result ranking, as illustrated in FIG. 4.

Figure 5:
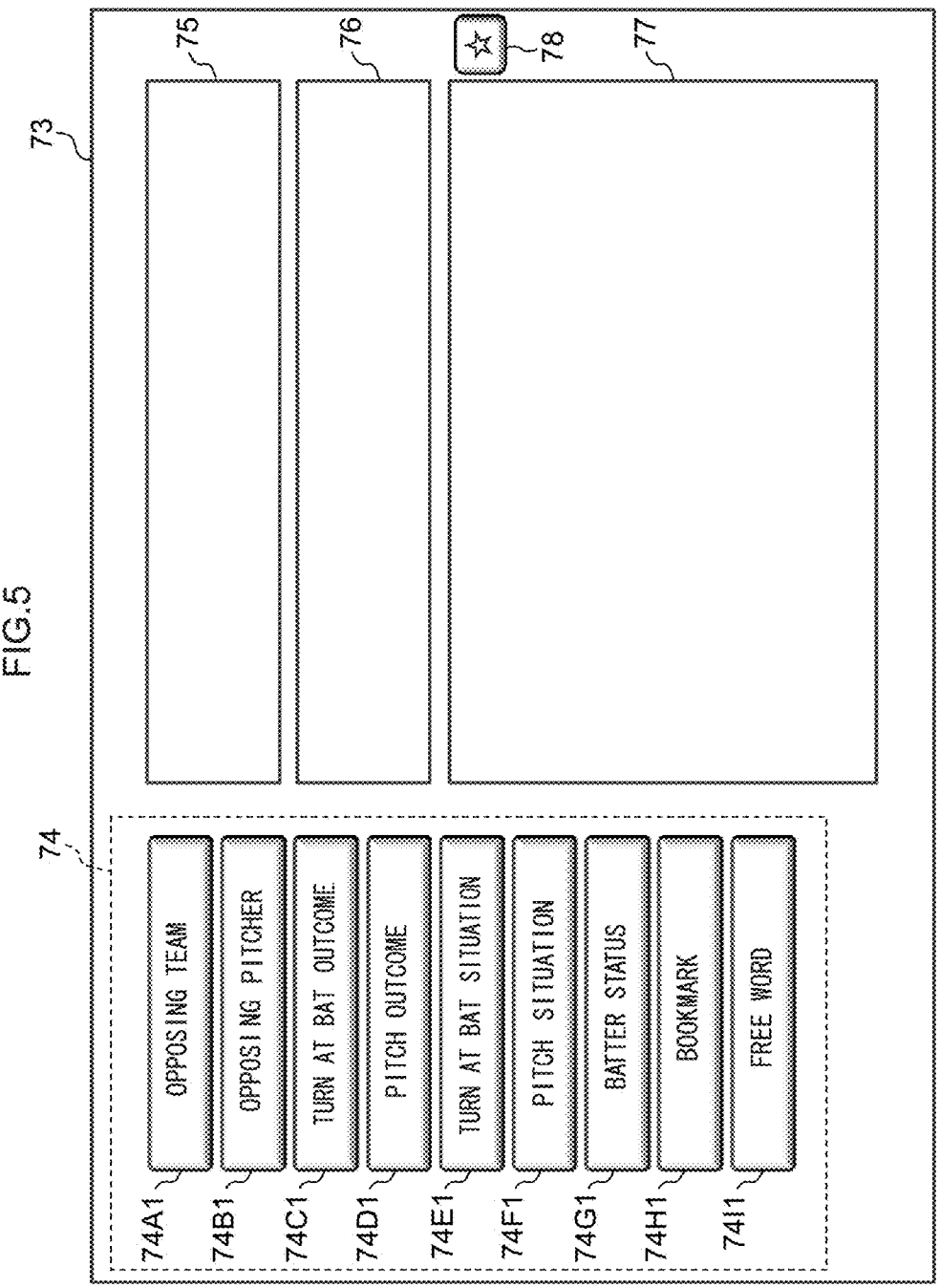
FIG. 5 is a drawing illustrating an example of a playback search screen.

The display controller 11 also controls to display a playback search screen 73, such as that illustrated in FIG. 5, on the display section of the user terminal 30 when the user has selected a player from the player selection screen 72. The playback search screen 73 includes a search condition designation region 74, a turn at bat selection region 75, a pitch selection region 76, a playback region 77, and a bookmark registration button 78.

The search condition designation region 74 displays plural search condition designation buttons for designating the type of turn at bat scene of the selected player for which to search for footage, in a state allowing selection by the user.

In the example of FIG. 5, an opposing team designation button 74A1, an opposing pitcher designation button 74B1, a turn at bat outcome designation button 74C1, and a pitch outcome designation button 74D1 are provided as the search condition designation buttons. Moreover, a turn at bat situation designation button 74E1, a pitch situation designation button 74F1, a batter status designation button 74G1, a bookmark designation button 74H1, and a free word designation button 74I1 are also provided as search condition designation buttons.

Figure 6:
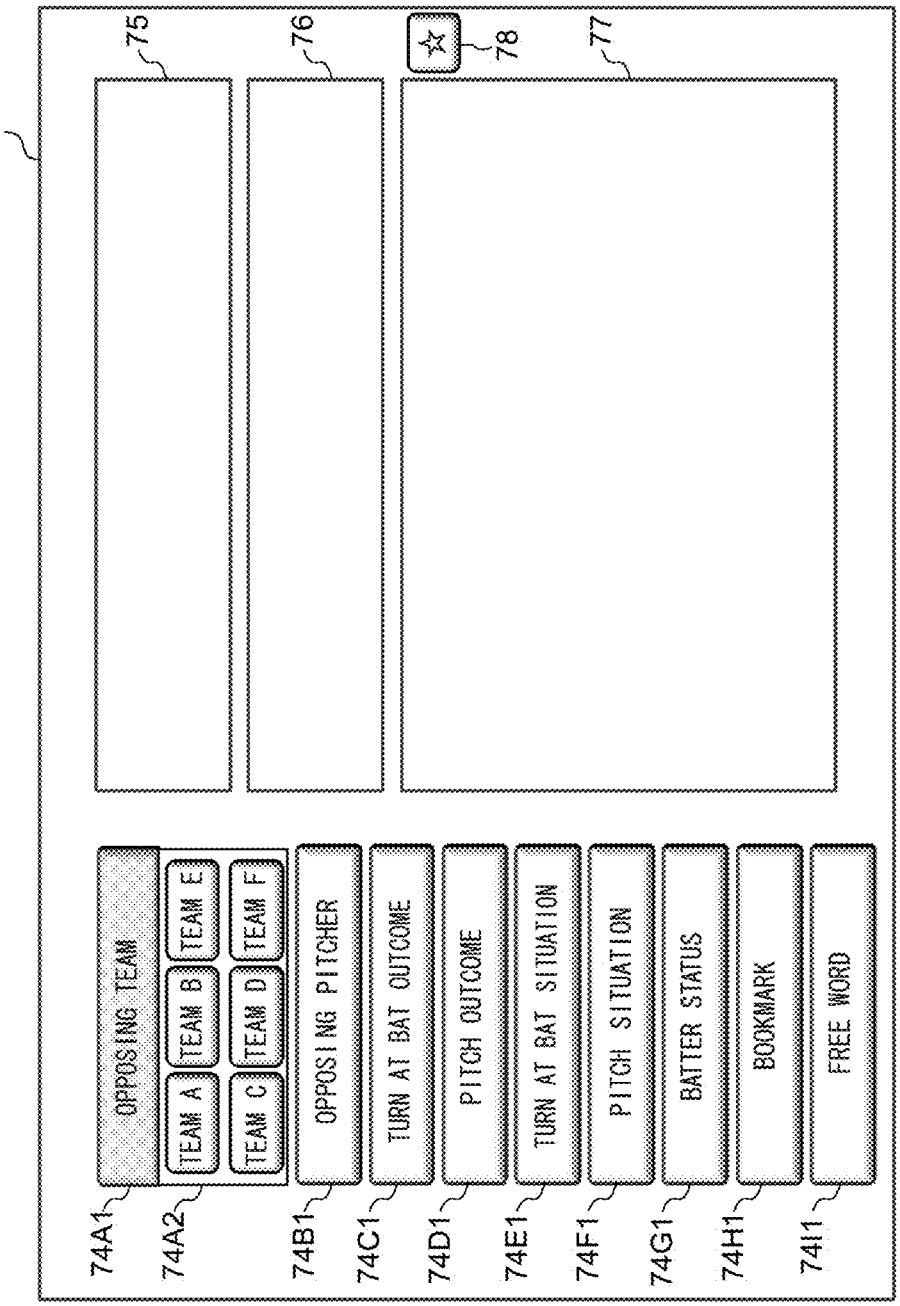
FIG. 6 is a drawing illustrating an example of a detailed designation region corresponding to an opposing team designation button.

When the user has selected the opposing team designation button 74A1, as illustrated in FIG. 6, the display controller 11 for example expands a region below the opposing team designation button 74A1, and displays a detailed designation region 74A2 for designating detailed search conditions relating to the opposing team. In the example of FIG. 6, the detailed designation region 74A2 includes respective selectable buttons of opposing teams (pitching side teams). Selection of the team and various conditions may, for example, be performed by a clicking operation of the buttons displayed on the screen.

Figure 7:
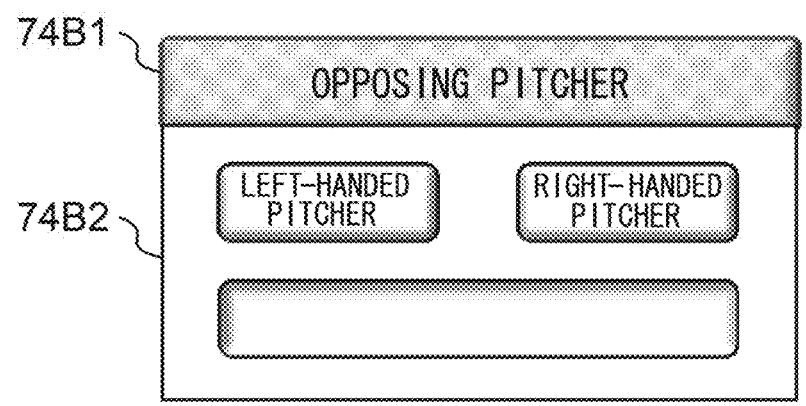
FIG. 7 is a drawing illustrating an example of a detailed designation region corresponding to an opposing pitcher designation button.

When the user has selected the opposing pitcher designation button 74B1, as illustrated in FIG. 7, the display controller 11 for example displays a detailed designation region 74B2 relating to the opposing pitcher. In the example of FIG. 7, the detailed designation region 74B2 includes a button to designate whether the opposing pitcher to be designated is a left-handed pitcher or a right-handed pitcher, and a text box for directly entering the name of the opposing pitcher to be designated.

Note that FIG. 7 only illustrates some of the search condition designation buttons and the detailed designation region of the playback search screen 73 illustrated in FIG. 6. The same also applies for FIG. 8 to FIG. 14 below.

Figure 8:
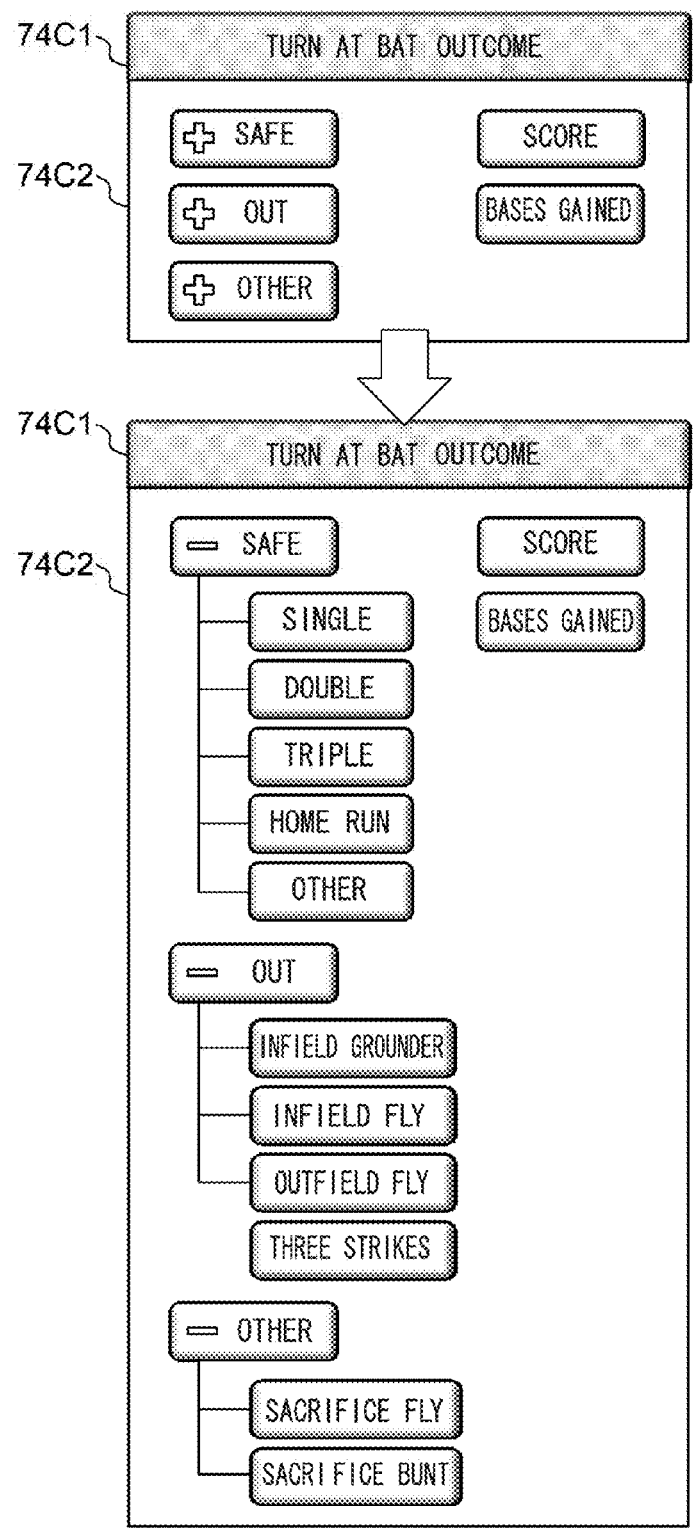
FIG. 8 is a drawing illustrating an example of a detailed designation region corresponding to a turn at batturn at bat outcome designation button.

When the user has selected the turn at bat outcome designation button 74C1, as illustrated at the top of FIG. 8 for example, the display controller 11 displays a detailed designation region 74C2 relating to the turn at bat outcome. In the example of FIG. 8, the detailed designation region 74C2 includes buttons for designating broad categories of turn at bat outcome, namely "safe", "out", and "other". When the user has selected one of the buttons for the broad categories, as illustrated at the bottom of FIG. 8, the display controller 11 further expands the detailed designation region 74C2 to expand buttons relating to the selected broad category, and displays buttons for designating precise categories of turn at bat outcome.

For example, when the broad category of "safe" is expanded, buttons are displayed for the precise categories of "single", "double", "triple", "home run", "other", and the like. Note that "other" includes four-pitch walks and the like. When the broad category of "out" is expanded, buttons are displayed for the precise categories of "infield grounder", "infield fly", "outfield fly", "strike-out", and the like. When the broad category of "other" is expanded, buttons are displayed for the precise categories of "sacrifice fly", "sacrifice bunt". This thereby enables designation of turn at bat outcomes according to the type of hit and where the ball went. Note that the method of categorizing the broad categories and precise categories is not limited to the example of FIG. 8, and appropriate settings may be made according to the turn at bat outcome information included in the metadata DB 22.

The detailed designation region 74C2 further includes a "score" button to designate turn at bats in which points were gained, and a "bases gained" button to designate turn at bats in which runners gained bases as the turn at bat outcome result in the example of FIG. 8. This thereby enables, for example, search designating cases other than sacrifice flies or sacrifice bunts in which the turn at bat outcome was out, such as cases in which points were gained during an infield grounder, or turn at bats in which runners gained bases. This thereby enables designation of turn at bats in which the turn at bat outcome was out, but that were important in terms of contribution.

Figure 9:
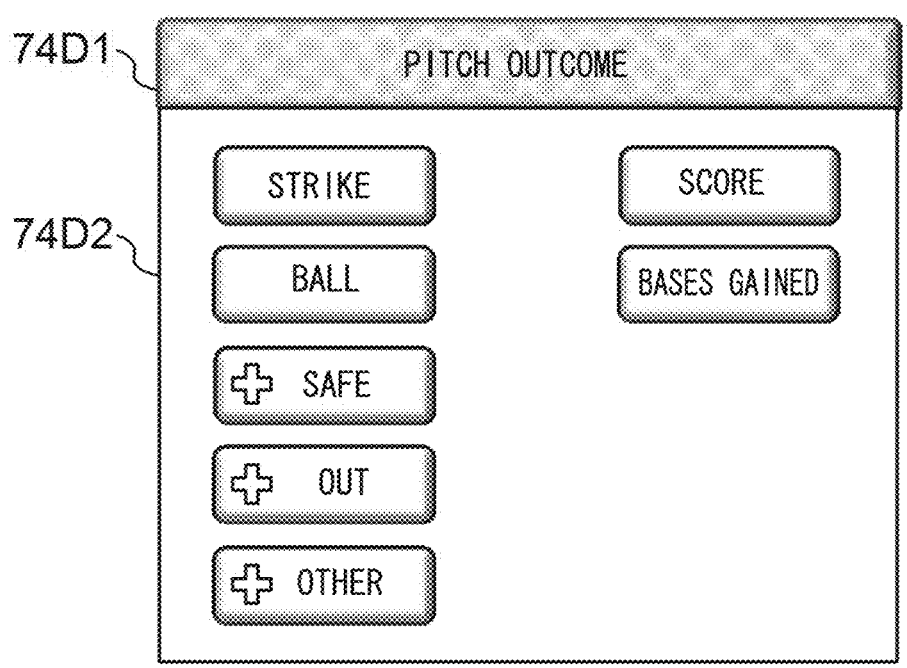
FIG. 9 is a drawing illustrating an example of a detailed designation region corresponding to a pitch outcome designation button.

When the user has selected the pitch outcome designation button 74D1, as illustrated in FIG. 9 for example, the display controller 11 displays a detailed designation region 74D2 relating to the pitch outcome. In the example of FIG. 9, the detailed designation region 74D2 includes buttons for designating the pitch outcomes "strike" and "ball". The pitch outcome relating to the final pitch of each turn at bat is similar to the turn at bat outcome. Accordingly, the detailed designation region 74D2 includes buttons to designate the broad categories of "safe", "out", and "other", and buttons to designate "score" and "bases gained", similarly to the detailed designation region 74C2 relating to turn at bat outcome. Similarly again, when the broad categories "safe", "out", and "other" are selected, the buttons of the respective broad categories expand to display buttons for designating precise categories.

Figure 10:
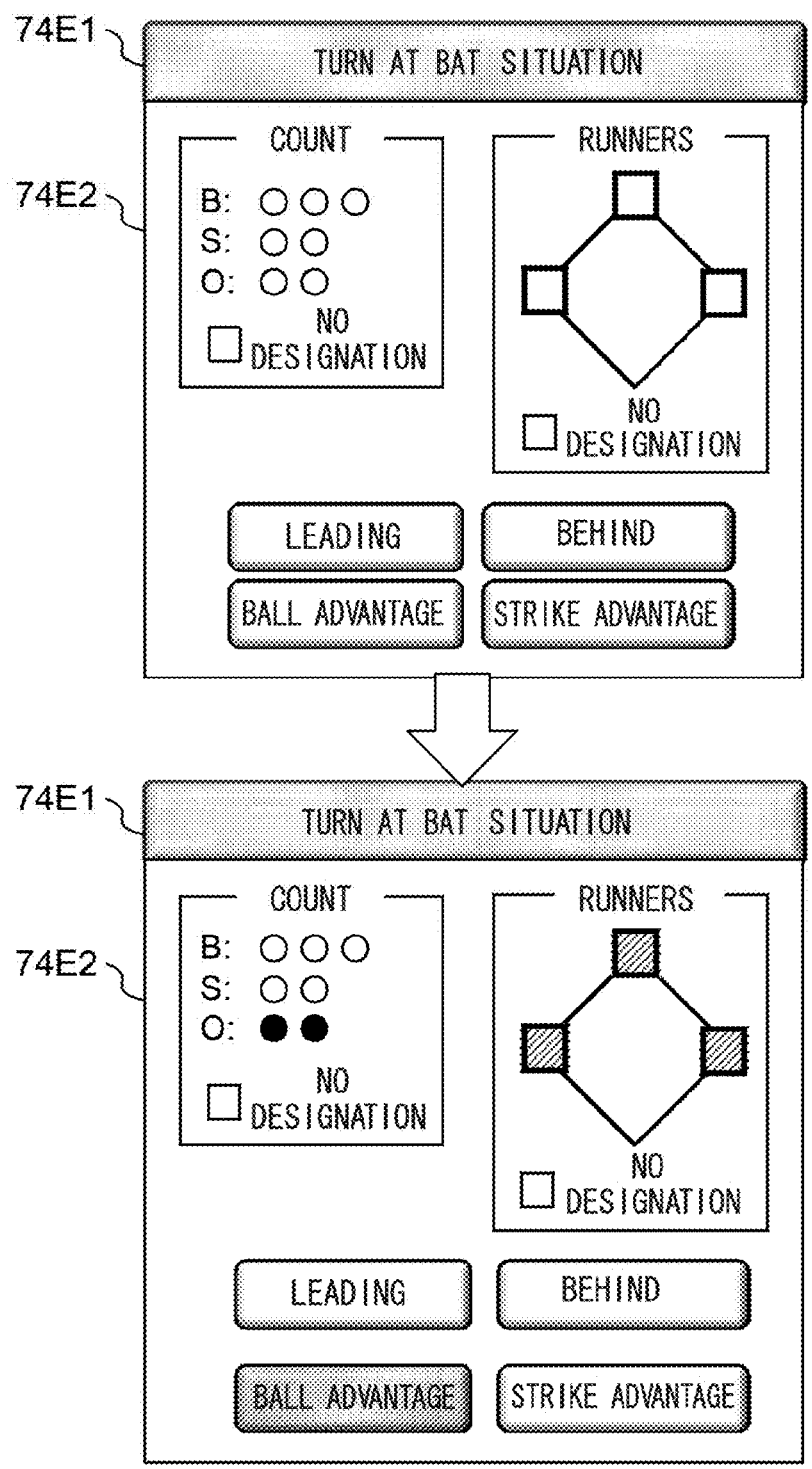
FIG. 10 is a drawing illustrating an example of a detailed designation region corresponding to a turn at batturn at bat situation designation button.

When the user has selected the turn at bat situation designation button 74E1, as for example illustrated at the top of FIG. 10, the display controller 11 displays a detailed designation region 74E2 relating to the situation of the turn at bat. In the example of FIG. 10, the detailed designation region 74E2 includes a region for designating the ball count, the strike count, and the out count, and a region for designating which bases are occupied by runners. When designating a situation of the count or runners, a check box is provided to select "no designation", in order to distinguish between designating no counts or no runners, and nothing having being designated. Moreover, the detailed designation region 74E2 includes a button for designating whether the team (the batting side team) is in the lead or behind, and a button for designating whether the pitches of the pitcher at the turn at bat are ball advantage or strike advantage.

For example, the bottom of FIG. 10 illustrates as a turn at bat situation an example of a state of the detailed designation region 74E2 for a turn at bat situation in a case in which a turn at bat has been designated in which there are two outs, all the bases are full, and there is ball advantage. Note that by designating ball advantage or strike advantage as well as designating the ball count and the strike count, the circumstances by which the turn at bat reached that count can be designated even for cases in which the designated ball counts and strike counts are the same.

Figure 11:
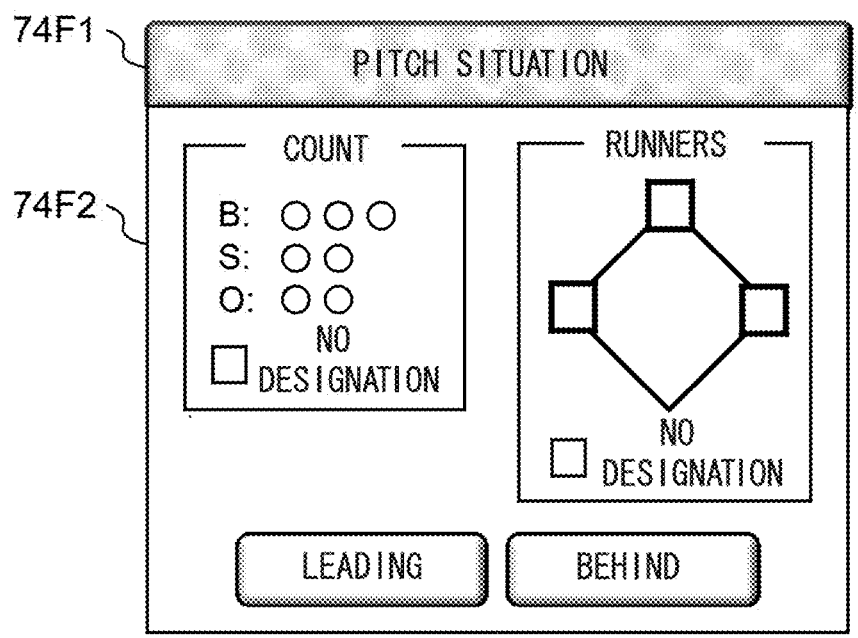
FIG. 11 is a drawing illustrating an example of a detailed designation region corresponding to a pitch situation designation button.

When the user has selected the pitch situation designation button 74F1, as for example illustrated in FIG. 11, the display controller 11 also displays a detailed designation region 74F2 for the pitch situation. The contents displayed in the detailed designation region 74F2 for pitch situation are similar to the contents displayed in the detailed designation region 74E2 for turn at bat situation, except that there is no button for designating whether there is ball advantage or strike advantage.

Figure 12:
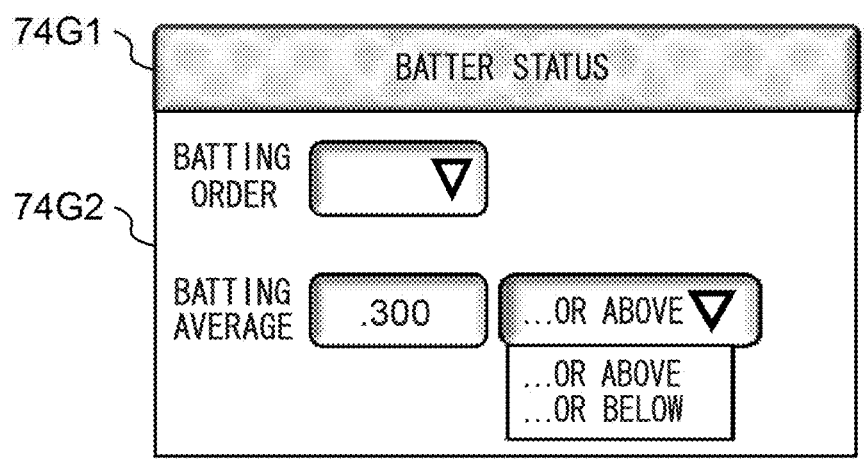
FIG. 12 is a drawing illustrating an example of a detailed designation region corresponding to a batter status designation button.

When the user has selected the batter status designation button 74G1, as for example illustrated in FIG. 12, the display controller 11 also displays a detailed designation region 74G2 for the batter status. In the example of FIG. 12, the detailed designation region 74G2 includes an input region for designating the position of the selected batter in the batting order in the turn at bats to be searched for. This input region may, for example, be configured by an input box enabling designation of any of 1, 2, and so on until 9 from a pull-down menu. The detailed designation region 74G2 also includes an input region for designating the batting average of the batter during the turn at bat. This input region may, for example, include a text box for directly inputting the batting average, and an input box enabling designation of ". . . or higher" or ". . . or lower" from a pull-down menu. This combination of a text box and an input box enables designation of a batting average of a certain ratio or above, or of a certain ratio or below.

Figure 13:
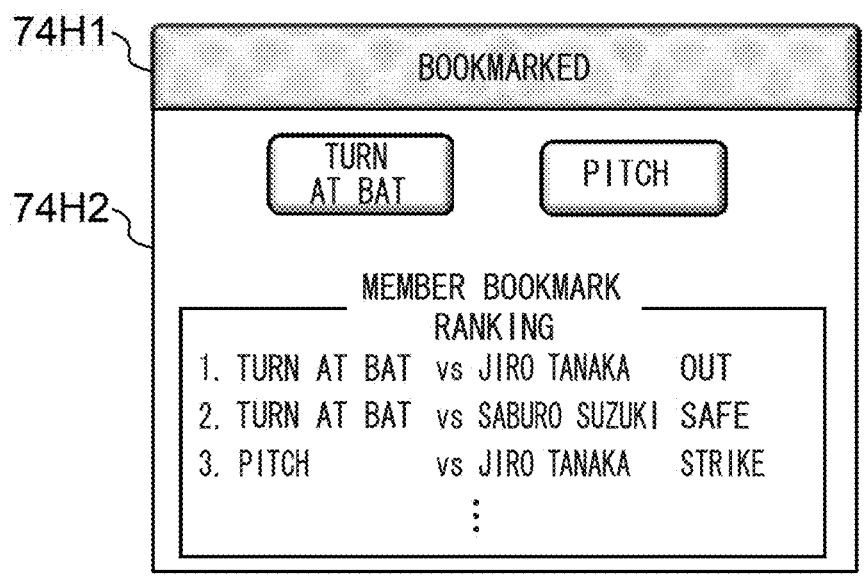
FIG. 13 is a drawing illustrating an example of a detailed designation region corresponding to a bookmarked footage designation button.

When the user has selected the bookmark designation button 74H1, as for example illustrated in FIG. 13, the display controller 11 also displays a detailed designation region 74H2 relating to bookmarked footage. In the example of FIG. 13, the detailed designation region 74H2 includes a button for designating footage of each individual turn at bat or each individual pitch from the footage registered as bookmarked footage. The detailed designation region 74H2 moreover includes a displayed list of footage of a specific number of individual turn at bats or individual pitches in order of the number of users that have registered the footage as bookmarked footage, in a state enabling the user to select any of the footage.

Specifically, the display controller 11 counts the number of user IDs registered in the "bookmarked" item of each record in the turn at bat data table 23 and the pitch data table 24, and extracts the specific number of records in sequence of the largest number of user IDs. The display controller 11 then displays each extracted record under a heading employing specific information selected from the metadata DB 22, and displays each heading in the detailed designation region 74H2 ordered by rank, for example. In the example of FIG. 13, information representing whether the records were extracted from either the turn at bat data table 23 or the pitch data table 24, information regarding the opposing pitcher, and the turn at bat outcome or pitch outcome are employed as the heading representing each record. The display controller 11 moreover associates with each heading the frame time of the record represented by each heading, and classification information representing whether the footage represented by each record is footage of an individual turn at bat or footage of an individual pitch. Setting is made such that when a heading has been selected by the user, the frame time and the section information associated with the selected heading are transmitted from the user terminal 30 to the footage provision device 10. The information included in the headings of the list of the detailed designation region 74H2 is not limited to metadata, and may, for example, be information regarding the name of the opposing team or the game date, obtained from the file name or from header information of the footage file containing the footage of the individual turn at bat, or the individual pitch, corresponding to the extracted record.

Figure 14:
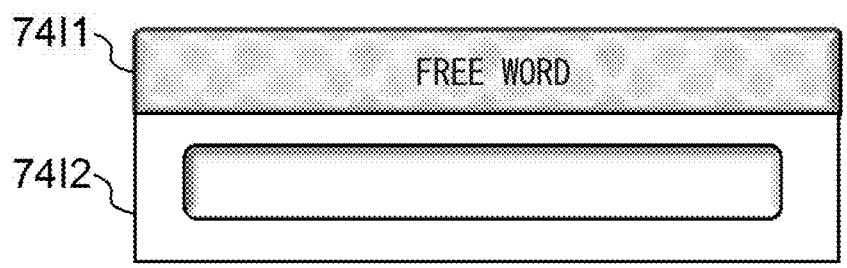
FIG. 14 is a drawing illustrating an example of a detailed designation region corresponding to a free word designation button.

When the user has selected the free word designation button 74I1, as for example illustrated in FIG. 14, the display controller 11 also displays a detailed designation region 74I2 for free words. In the example of FIG. 14, the detailed designation region 74I2 includes a text box enabling input of desired text key word.

The display controller 11 displays on the turn at bat selection region 75 thumbnail images of footage of individual turn at bats found by the search section 12, described later, according to the search conditions designated by the user at the search condition designation region 74, in a state enabling selection by the user. The display controller 11 displays on the pitch selection region 76 thumbnail images of footage of individual pitches included in the footage of the individual turn at bat corresponding to a selected thumbnail image from the thumbnail images displayed in the turn at bat selection region 75, in a state enabling selection by the user. When one of the thumbnail images displayed in the turn at bat selection region 75 has been selected, the display controller 11 plays back the footage of the individual turn at bat corresponding to the selected thumbnail image in the playback region 77. When one of the thumbnail images displayed in the pitch selection region 76 has been selected, the display controller 11 plays back the footage of the individual pitch corresponding to the selected thumbnail image in the playback region 77.

Figure 15:
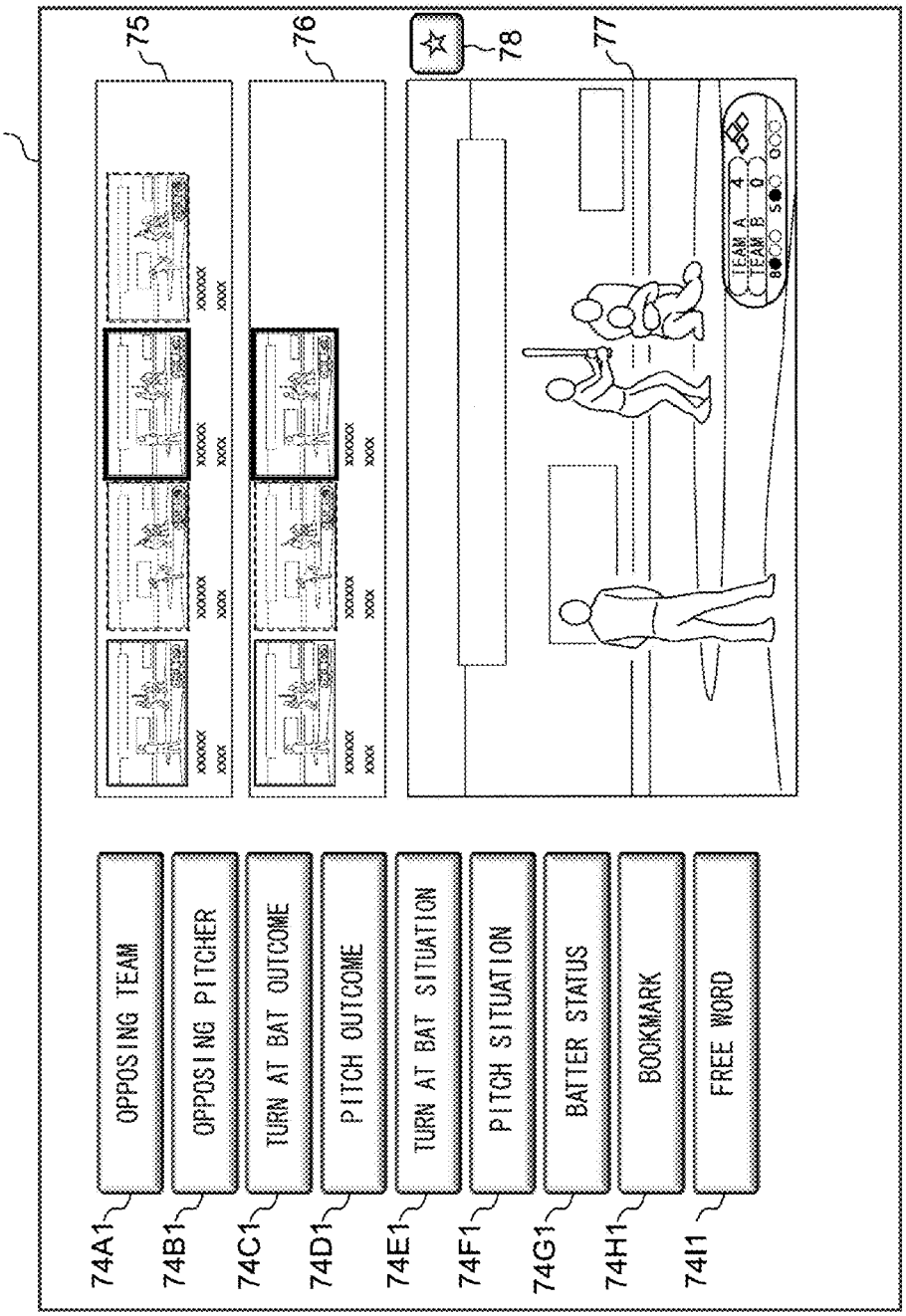
FIG. 15 is a drawing illustrating an example of a playback search screen.

FIG. 15 illustrates an example of the playback search screen 73 when search has been performed based on the designated search conditions, thumbnail images have been displayed on the turn at bat selection region 75 and the pitch selection region 76, and footage is being played back on the playback region 77. FIG. 15 illustrates an example in which four turn at bats match the designated search conditions. Out of the thumbnail images representing the four turn at bats, the thumbnail image third from the left has been selected, and the turn at bat corresponding to the selected thumbnail image includes three pitches. Out of these, a case is illustrated in which footage of the third pitch is being played back in the playback region 77. Note that in the example of FIG. 15, the selected thumbnail images are shown with bold borders.

Figure 16:
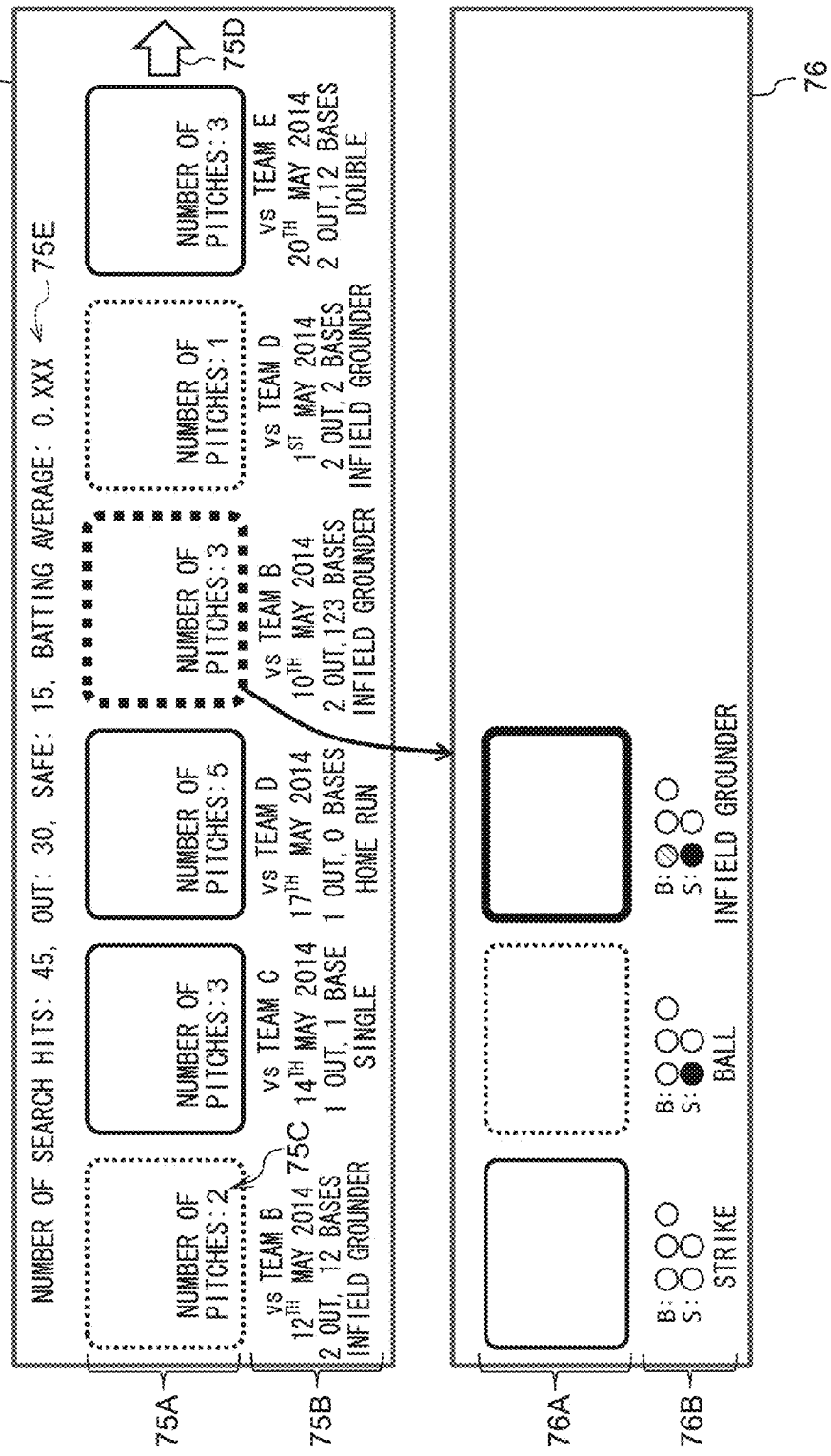
FIG. 16 is a drawing illustrating an example of a turn at batturn at bat selection region and a pitch selection region.

Accompanying the thumbnail images displayed on the turn at bat selection region 75 and the pitch selection region 76, the display controller 11 also displays information relating to the turn at bats or pitches represented by the thumbnail images. For example, as illustrated in FIG. 16, the turn at bat selection region 75 is provided with a metadata display region 75B in a region below a thumbnail image display region 75A, to display metadata relating to the turn at bat. In the example of FIG. 16, the opposing team, the date and time of the game, turn at bat situation, and turn at bat outcome are displayed. Note that although the date and time of the game are not included in the metadata DB 22 illustrated in FIG. 2, these can be acquired from the file name or header information of each footage file. The number of pieces of footage of individual pitches included in the footage of an individual turn at bat corresponding to each thumbnail image may be displayed so as to overlay the thumbnail image as the number of pitches in that turn at bat (75C in FIG. 16).

When not all of the display thumbnail images of the turn at bats matching the designated search conditions can be displayed on the turn at bat selection region 75, the display controller 11 displays a scroll button 75D for selecting display of the thumbnail images that could not be displayed. The display controller 11 may also display summary information 75E for the turn at bats matching the designated search conditions. In the example of FIG. 16, the number of turn at bats matching the designated search conditions (number of search hits), and amongst these, the number of turn at bats with a turn at bat outcome of "out", the number of turn at bats with a turn at bat outcome of "safe", and the batting average for the designated search conditions are displayed as the summary information 75E.

As described above, the display controller 11 highlights the selected thumbnail image in the turn at bat selection region 75 by displaying a bold border or the like. The display controller 11 also varies the display style of the thumbnail images according to the turn at bat outcome corresponding to each thumbnail image. In the example of FIG. 16, the thumbnail image corresponding to the turn at bat has a solid border when the turn at bat outcome was "safe", and an intermittent border when the turn at bat outcome was "out". Moreover, for example, the border color of the thumbnail image may also be varied, or the display size of the thumbnail image may be varied in order to distinguish between display for "out" and "safe". There is no limitation to varying the display style of the thumbnail images between "out" and "safe", and the thumbnail image display style may be varied according to the opposing team, or whether the opposing pitcher is a left-handed pitcher or a right-handed pitcher, for example.

The display controller 11 also, for example, displays metadata relating to the pitch in a metadata display region 76B provided in a region below a thumbnail image display region 76A in the pitch selection region 76, as illustrated in FIG. 16. In the example of FIG. 16, symbols for the ball count and the strike count that are pitch situations are displayed. The pitch outcomes, such as "strike" or "ball", are also displayed.

Note that the information displayed accompanying the thumbnail images displayed in the turn at bat selection region 75 and the pitch selection region 76 is not limited to the above examples. For example, as the metadata for footage of an individual turn at bat, information representing the position number of the turn at bat in the game may be also stored in advance, and displayed as accompanying information. Using the information regarding the turn at bat position number, the turn at bat outcome of the turn at bat preceding the turn at bat extracted based on the designated search conditions may be displayed as accompanying information.

Although omitted from illustration in the drawings, the playback search screen 73 includes a playback button, a pause button, a fast-forward button, a rewind button, a slow playback button and the like in order to control playback of the footage on the playback region 77. The display controller 11 controls the footage being played back on the playback region 77 according to the selected button when any of these playback control buttons has been selected. The display controller 11 may also control to display metadata, relating to the turn at bat or pitch corresponding to the footage being played back on the playback region 77, overlaid on the footage being played back. For example, information regarding the ball count, strike count, and out count may be displayed overlaid on the footage being played back.

Figure 17:
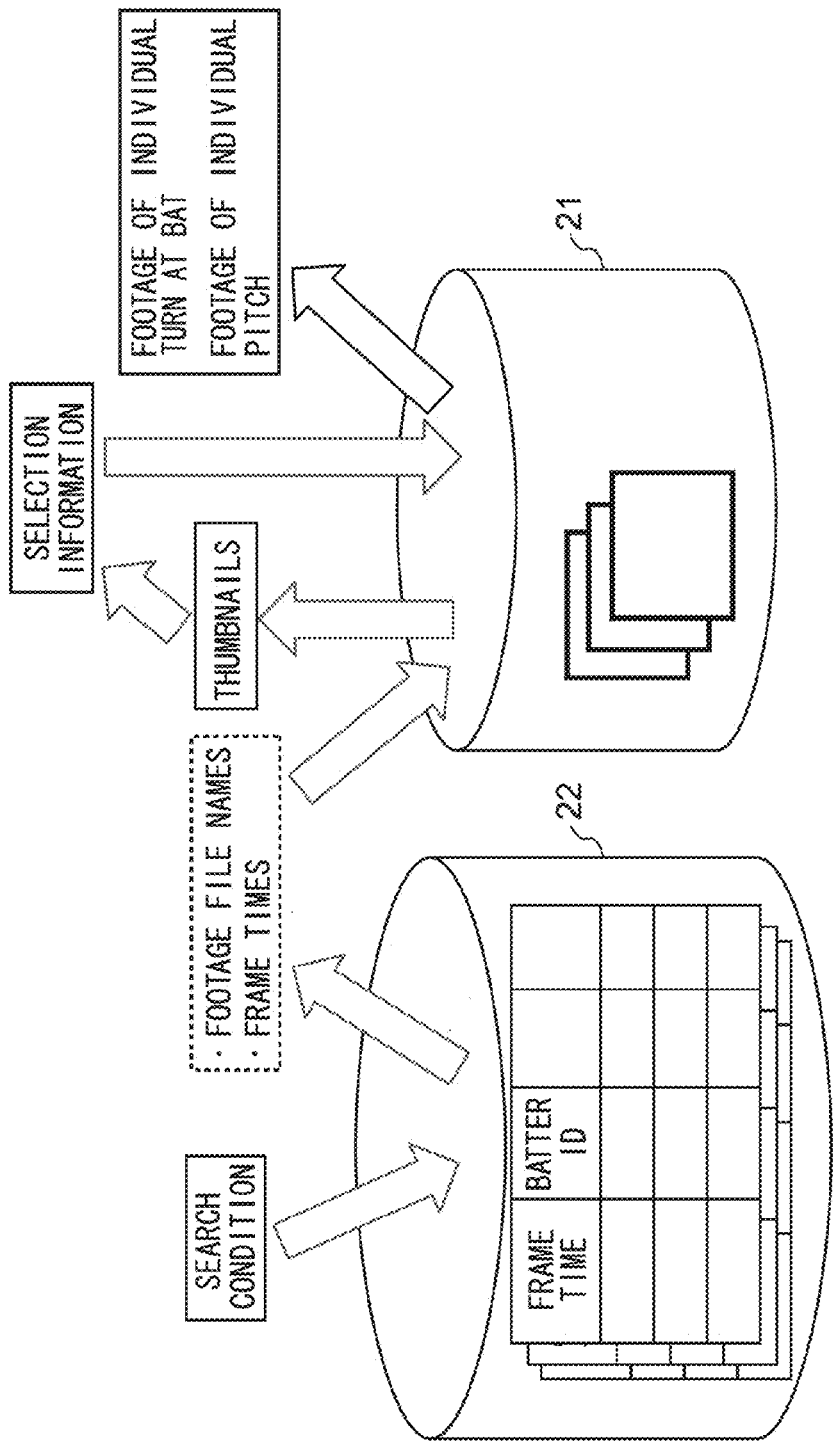
FIG. 17 is a diagram to explain processing of a search section.

The search section 12 receives player information selected by the user on the player selection screen 72 displayed on the user terminal 30, and receives search conditions designated by the user using the search condition designation region 74 of the playback search screen 73 displayed on the user terminal 30. As illustrated in FIG. 17, the search section 12 searches the metadata DB 22 based on the received player information and search conditions, and extracts records for each player representing footage of individual turn at bat and footage of individual pitches matching the search conditions. The file names of the footage files including the footage of the individual turn at bats matching the search conditions are also acquired together.

The search section 12 searches the footage file DB 21 for footage of individual turn at bats and footage of individual pitches matching the search conditions, based on the acquired footage file names and records, and acquires thumbnail images. Each thumbnail image is acquired by, for example, reducing the size of an image of at least one frame (for example the start frame) out of the plural frames included in the footage of the individual turn at bat or the footage of the individual pitch matching the search conditions, such that the image can be displayed in the turn at bat selection region 75 or the pitch selection region 76. The search section 12 passes each acquired thumbnail image to the display controller 11 together with the record representing the footage of the individual turn at bat or the footage of the individual pitch.

The search section 12 also receives thumbnail image information selected by the user (referred to below as "selected information") on the turn at bat selection region 75 or the pitch selection region 76. The search section 12 searches the footage file DB 21 based on the selected information, extracts the selected footage of individual turn at bat or footage of the individual pitch, and passes the extracted footage to the display controller 11.

Detailed explanation follows regarding search performed by the search section 12 by player information and each search condition. Note that in the following explanation, extraction of records from each respective table refers to extraction of all records that match the conditions.

On receipt of player information selected from the player selection screen 72, the search section 12 acquires the batter ID of that player (batter) from the batter data table 25. The search section 12 extracts any records for which the "batter ID" item matches the acquired batter ID from the turn at bat data table 23 in order to extract the footage of the individual turn at bats of the selected player. The search section 12 also extracts any records for which the "batter ID" item matches the acquired batter ID from the pitch data table 24 in order to extract the footage of the individual pitches included in the extracted footage of the individual turn at bats.

In the following detailed description of search according to each condition described below, the footage of the individual turn at bat and the footage of the individual pitches extracted based on the player information as described above is narrowed down further. The following explanation regarding the extraction of records (footage of the individual turn at bat) from the turn at bat data table 23 assumes that the records extracted based on the player information are to be narrowed down further.

When opposing team information has been received as a search condition, the search section 12 acquires the pitcher IDs for which the "team" item matches the received opposing team information from the pitcher data table 26 illustrated in FIG. 2. The search section 12 extracts any records for which the "pitcher ID" item matches the acquired pitcher ID from the turn at bat data table 23 in order to extract footage of the individual turn at bats matching the search conditions. Note that since the method for extracting the footage of the individual pitches based on the footage of the individual turn at bats is similar to that described above, explanation thereof is omitted below.

When, as opposing pitcher information, information representing a right-handed pitcher or a left-handed pitcher has been received as a search condition, the search section 12 acquires from the pitcher data table 26 pitcher IDs of records for which the "left/right" item matches the received right-handed pitcher or left-handed pitcher information. When, as opposing pitcher information, information of a player name has been received as a search condition, the search section 12 acquires pitcher IDs of records for which the "player name" item matches the received pitcher name information from the pitcher data table 26. The search section 12 then extracts the footage of the individual turn at bat from the turn at bat data table 23, similarly to when the opposing team is a search condition as described above.

When turn at bat outcome information has been received as a search condition, the search section 12 extracts from the turn at bat data table 23 any records for which the "turn at bat outcome", "score", and "bases gained" items match the received turn at bat outcome information in order to extract footage of the individual turn at bats matching the search conditions. Note that when the received turn at bat outcome information is for a broad category, such as "out", or "safe", all of the precise categories of turn at bat outcome included within that broad category are searched for.

When pitch outcome information has been received as a search condition, the search section 12 extracts from the pitch data table 24 any records for which the "pitch outcome" item matches the received pitch outcome information, in order to extract footage of the individual pitches matching the search conditions. The search section 12 also extracts from the turn at bat data table 23 any records for which the "turn at bat ID" item matches the turn at bat ID included in the records extracted from the pitch data table 24, in order to extract the footage of the individual turn at bats that include the pitches matching the search conditions. Note that in cases in which the received pitch outcome information relates to the final pitch of a turn at bat, the search section 12 extracts records similarly to when the search condition is the turn at bat outcome. Specifically, the search section 12 extracts from the turn at bat data table 23 any records for which the "turn at bat outcome", "score", and "bases gained" items match the received pitch outcome information relating to the final pitch.

When turn at bat situation information has been received as a search condition, the search section 12 extracts from the pitch data table 24 any records for which specific items match the received turn at bat situation information. The specific items referred to here are the items "ball count", "strike out", "out count", "runners", and "score situation". The search section 12 extracts from the turn at bat data table 23 any records for which the "turn at bat ID" item matches the turn at bat IDs of the records extracted from the pitch data table 24, in order to extract the footage of individual turn at bats matching the search conditions.

When strike advantage or ball advantage has been designated as a turn at bat situation, the search section 12 extracts from the turn at bat data table 23 any records for which the "advantage information" item matches the designated strike advantage or ball advantage information. When a count (referring here to the ball count or the strike count) has been designated together with the strike advantage or ball advantage, the search section 12 first extracts the corresponding records from the pitch data table 24 similarly to as described above. Any records for which the "batter ID" item matches the batter ID of the records extracted from the pitch data table 24 and the "advantage information" item matches the designated strike advantage or ball advantage, are then extracted from the turn at bat data table 23. This thereby enables search for turn at bats taking into account the circumstances of the pitch, such as a turn at bat arriving at the designated count with strike advantage, or a turn at bat arriving at the designated count with ball advantage.

Cases in which pitch situation information has been received as a search condition are similar to cases in which turn at bat situation information other than information designating strike advantage or ball advantage has been received as a search condition.

When batter status information has been received as a search condition, the search section 12 extracts from the turn at bat data table 23 any records for which the "batting order" and "batting average" items match the received batter status information.

When information designating bookmarked footage relating to a "turn at bat" has been received as a search condition, the search section 12 acquires the user ID of the user using the footage provision device 10, and extracts from the turn at bat data table 23 any records including the acquired user ID in the "bookmarked" item. When information designating bookmarked footage relating to a "pitch" has been received as a search condition, the search section 12 acquires the user ID, and extracts from the pitch data table 24 any records including the acquired user ID in the "bookmarked" item.

When information of bookmarked footage designated from the ranked list has been received, for example, the search section 12 selects the turn at bat data table 23 or the pitch data table 24 based on the turn at bat or pitch classification information included in the received bookmarked footage information. The search section 12 then extracts from the turn at bat data table 23 or the pitch data table 24 any records for which the "frame time" item matches the frame time included in the received bookmarked footage information.

When text data directly input as free words has been received as a search condition, the search section 12 extracts from the turn at bat data table 23 any records for which the "outcome details" item includes the received text data. For example, when "right fly" has been designated as a free word, any records in which the "outcome details" are "right fly" are extracted. Moreover, when "right" has been designated as a free word, records for which the "outcome details" item includes "right", such as "right front hit" and "right fly", are extracted.

When the user has selected the bookmark registration button 78 in a state in which footage is being played back in the playback region 77, the registration section 13 executes bookmark registration processing. Specifically, in the turn at bat data table 23 or the pitch data table 24, the user ID is registered in the "bookmarked" item for the record corresponding to the footage that is being played back when the bookmark registration button 78 is selected. More specifically, when the footage that is being played back is footage of an individual turn at bat that is being played back due to selecting the thumbnail image displayed in the turn at bat selection region 75, the user ID is registered in the "bookmarked" item of the turn at bat data table 23. When the footage that is being played back is footage of an individual pitch that is being played back due to selecting the thumbnail image displayed in the pitch selection region 76, the user ID is registered in the "bookmarked" item of the pitch data table 24. Note that the user ID is acquired by, for example, requesting that the user logs in using their user ID when using the footage provision device 10.

Figure 18:
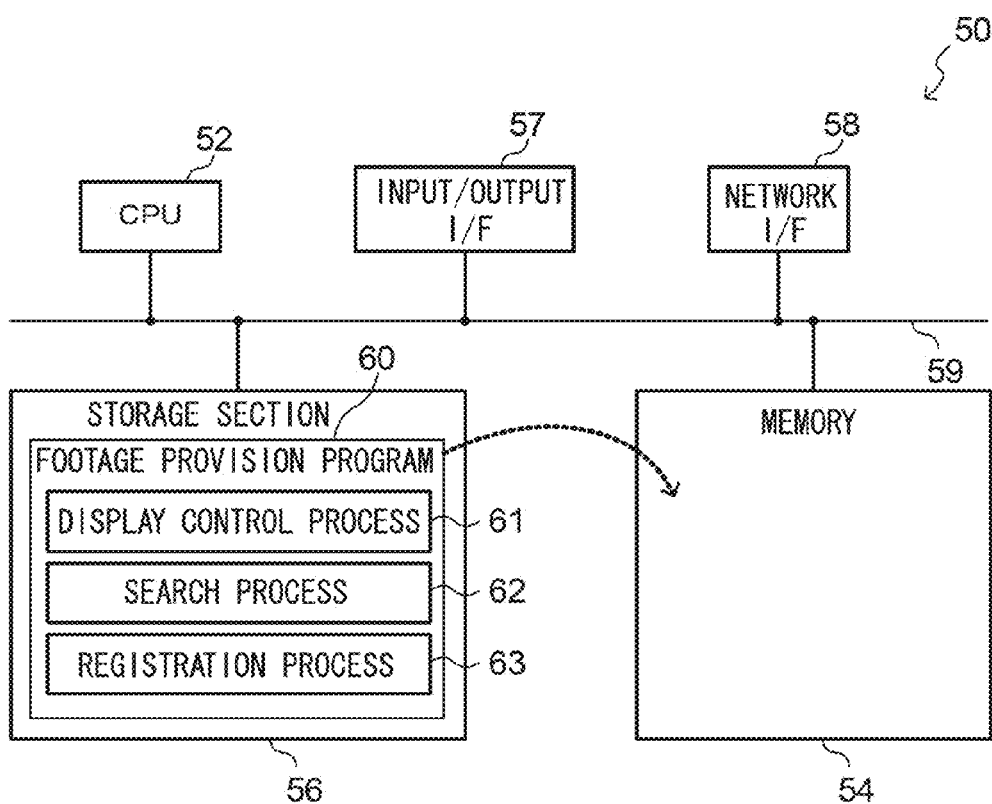
FIG. 18 is a block diagram schematically illustrating a computer that functions as a footage provision device according to the present exemplary embodiment.

The footage provision device 10 may be implemented by a computer 50, as illustrated in FIG. 18, for example. The computer 50 includes a CPU 52, memory 54, a non-volatile storage section 56, an input/output interface (I/F) 57, and a network I/F 58. The CPU 52, the memory 54, the storage section 56, the input/output I/F 57, and the network I/F 58 are connected together through a bus 59.

The storage section 56 may be implemented by a Hard Disk Drive (HDD), flash memory, or the like. The storage section 56 serving as a recording medium is stored with a footage provision program 60 that causes the computer 50 to function as the footage provision device 10. The CPU 52 reads the footage provision program 60 from the storage section 56, expands the footage provision program 60 in the memory 54, and sequentially executes processes of the footage provision program 60.

The footage provision program 60 includes a display control process 61, a search process 62, and a registration process 63. The CPU 52 operates as the display controller 11 illustrated in FIG. 1 by executing the display control process 61. The CPU 52 operates as the search section 12 illustrated in FIG. 1 by executing the search process 62. The CPU 52 operates as the registration section 13 illustrated in FIG. 1 by executing the registration process 63. The computer 50 executing the footage provision program 60 accordingly functions as the footage provision device 10.

The footage provision device 10 may also be implemented by a semiconductor integrated circuit, for example, and more specifically by an Application Specific Integrated Circuit (ASIC) or the like.

Next, explanation follows regarding operation of the footage provision device 10 according to the present exemplary embodiment. The footage provision device 10 executes the footage provision processing illustrated in FIG. 19 when an application for receiving footage provided from the footage provision device 10 is started up in the user terminal 30.

Figure 19:
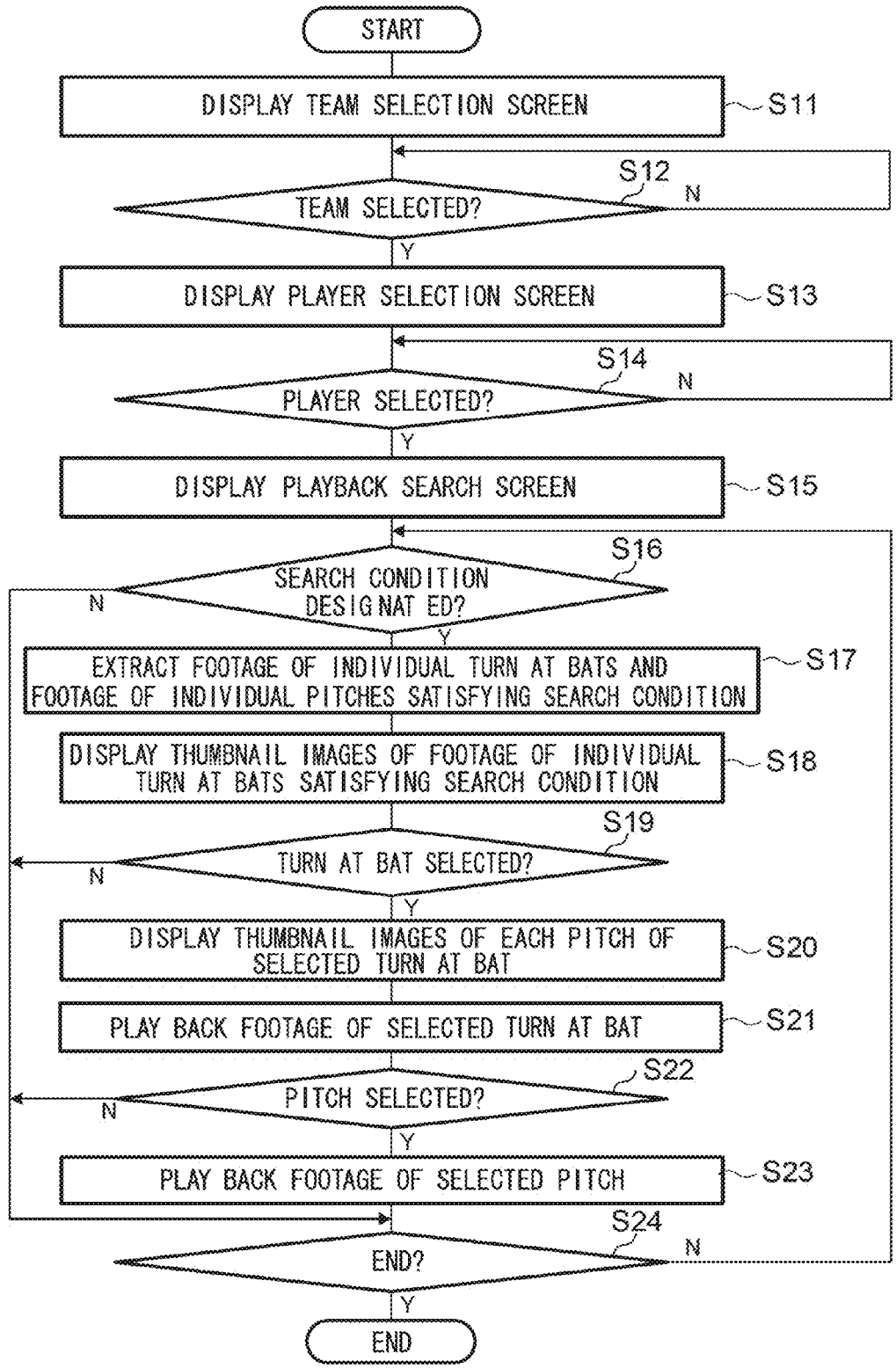
FIG. 19 is a flowchart illustrating an example of footage provision processing in the present exemplary embodiment.

At step S11 of the footage provision processing illustrated in FIG. 19, the display controller 11 displays the team selection screen 71, such as that illustrated on the left in FIG. 3 for example, on a display section of the user terminal 30. Next, at step S12, the display controller 11 determines whether or not the user has selected a team on the team selection screen 71. This determination may be determination as to whether or not information, transmitted from the user terminal 30 to the footage provision device 10 when a team is selected on the team selection screen 71, has been received. Processing transitions to step S13 when a team has been selected, and the determination of the present step is repeated until a selection is made when a team has not been selected.

At step S13, the display controller 11 displays the player selection screen 72, such as that illustrated on the right in FIG. 3 for example, on the display section of the user terminal 30. Next, at step S14, the display controller 11 determines whether or not the user has selected a player (batter) on the player selection screen 72. Processing transitions to step S15 when a player has been selected, and the determination of the present step is repeated until a selection is made when a player has not been selected.

At step S15, the display controller 11 displays the playback search screen 73, such as that illustrated in FIG. 5 for example, on the display section of the user terminal 30. The display controller 11 receives selection of the respective search condition designation buttons 74A1 to 74I1 displayed in the search condition designation region 74 of the playback search screen 73. The display controller 11 then displays the respective detailed designation regions 74A2 to 74I2, for example as illustrated in FIG. 6 to FIG. 14, corresponding to the selected search condition designation buttons 74A1 to 74I1.

Next, at step S16, the search section 12 determines whether or not the user has designated a search condition. Processing transitions to step S17 when a search condition has been designated, and processing transitions to step S24 when a search condition has not been designated.

At step S17, the search section 12 searches the metadata DB 22 based on the player information selected at step S14, and the search conditions designated at step S16. Any records representing footage of individual turn at bats and footage of individual pitches relating to that player that match the search condition are then extracted. Based on the extracted records, the search section 12 searches the footage file DB 21 for footage of individual turn at bats or footage of individual pitches, and acquires the thumbnail images from any of the frames included in the respective footage of individual turn at bats and footage of individual pitches that have been found. The search section 12 then passes the records extracted from the metadata DB 22, the acquired thumbnail images, and the file names of the footage files containing the footage represented by the extracted records to the display controller 11.

Next, at step S18, the display controller 11 displays the thumbnail images for the footage of individual turn at bats passed from the search section 12 in the turn at bat selection region 75 in a state allowing selection by the user.

Next, at step S19, the display controller 11 determines whether or not the user has selected any of the thumbnail images out of the thumbnail images displayed in the turn at bat selection region 75 in order to select a turn at bat. Processing transitions to step S20 when a turn at bat has been selected, and processing transitions to step S24 when a turn at bat has not been selected.

At step S20, the display controller 11 displays the thumbnail images for footage of the individual pitches included in the footage of the individual turn at bat selected at step S18 on the pitch selection region 76 in a user selectable state. To accompany this, at step S21, the display controller 11 also plays back the footage of the individual turn at bat selected at step S18 in the playback region 77.

Next, at step S22, the display controller 11 determines whether or not the user has selected any of the thumbnail images out of the thumbnail images displayed in the pitch selection region 76 in order to select a pitch. Processing transitions to step S23 when a pitch has been selected, and processing transitions to step S24 when a pitch has not been selected. At step S23, the display controller 11 plays back the footage of the individual pitch selected at step S22 in the playback region 77.

At step S24, the display controller 11 determines whether or not to end the footage provision processing. When not ending, processing returns to step S16. The footage provision processing is ended when, for example, a command transmitted from the user terminal 30 commanding the application to be closed has been received.

Explanation has been given regarding a configuration in which footage of an individual pitch is played back in the processing of steps S19 to S23; however other footage playback configurations are also possible. For example, configuration may be made such that in a state in which a thumbnail image of a turn at bat has been selected at step S19, and the selected thumbnail image has been clicked (selected) again in the turn at bat selection region 75, the footage of the turn at bat is played from beginning to end in the playback region 77. Such a configuration enables footage playback including scenes from footage that falls in-between pitches. A user may accordingly be allowed to select playback of footage of individual pitches, and to playback footage of a turn at bat from beginning to end.

As described above, in the footage provision device 10 according to the present exemplary embodiment, metadata representing outcomes, situation, and the like of turn at bats or pitches is associated with respective footage of individual turn at bats and footage of individual pitches in captured footage of a baseball game. Footage of individual turn at bats and footage of individual pitches matching designated search conditions is then searched for based on the metadata, and thumbnail images of the found footage are selectably displayed for each turn at bat and each pitch. This thereby enables the user to search easily for a desired scene.

Moreover, displaying metadata of the found footage, and statistical information relating to the found footage (for example the number of search hits, and the number of items for each turn at bat outcome) together with the thumbnail images of the found footage, makes it easier to ascertain the outline of the footage matching the search conditions.

In the present exemplary embodiment, information representing the situation, namely, the ball count and strike count during a pitch, can be designated as a search condition in combination with the strike advantage or ball advantage during a turn at bat, namely the trend of change in the ball count until the given ball count. This thereby enables designation of search conditions that take into account different circumstances leading up to a given count, even when the counts are the same. An increase in locatability can thereby be achieved when searching for desired scenes in baseball footage.

Figure 20:
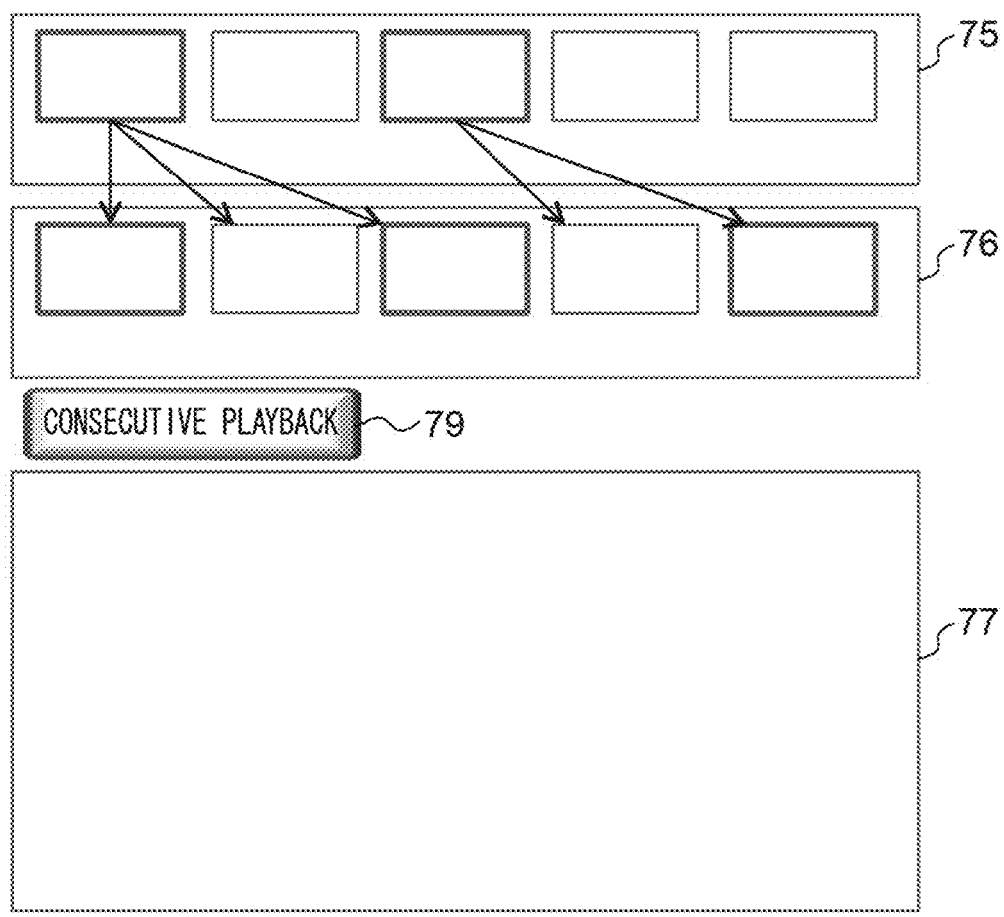
FIG. 20 is a drawing to explain selection of plural turn at batturn at bats.

In the exemplary embodiment described above, explanation has been given regarding a case in which thumbnail images representing footage of individual pitches included in the turn at bat corresponding to a single thumbnail image selected from the thumbnail images displayed in the turn at bat selection region 75 are displayed in the pitch selection region 76; however there is no limitation thereto. For example, as illustrated in FIG. 20, configuration may be made such that thumbnail images representing footage of individual pitches included in plural turn at bats corresponding to plural thumbnail images selected from the thumbnail images displayed in the turn at bat selection region 75 are displayed in the pitch selection region 76. In such cases, the correspondence relationships between the selected turn at bats and pitches may also be shown at the same time.

In the exemplary embodiment described above, explanation has been given regarding a case in which the search results for footage of individual turn at bats and footage of individual pitches are displayed as thumbnail images; however there is no limitation thereto. The metadata corresponding to the respective found footage of individual turn at bats and footage of individual pitches may be employed to display the footage of individual turn at bats and footage of individual pitches in a state enabling identification, and enabling selection by the user.

There is no limitation to configurations in which search results (thumbnail images) are displayed for both footage of individual turn at bats and footage of individual pitches, and configuration may be made so as to display only search results for footage of individual turn at bats, or only search results for footage of individual pitches. Even in cases in which only search results for footage of individual turn at bats is displayed, configuration may be made to play back footage of individual pitches included in footage of an individual turn at bat selected from the turn at bat selection region 75 on the playback region 77. Moreover, in cases in which only search results for footage of individual pitches are displayed, configuration may be made to display pitch summary information together with the search results for the footage of individual pitches similarly to the summary information 75E for turn at bats in the above exemplary embodiment. Note that pitch summary information may be displayed even when search results are displayed for both footage of individual turn at bats and footage of individual pitches.

In the exemplary embodiment described above, explanation has been given regarding a case in which footage of an individual pitch is played back when a thumbnail image has been selected from the turn at bat selection region 75; however various variations on this playback method exist.

Figure 21:
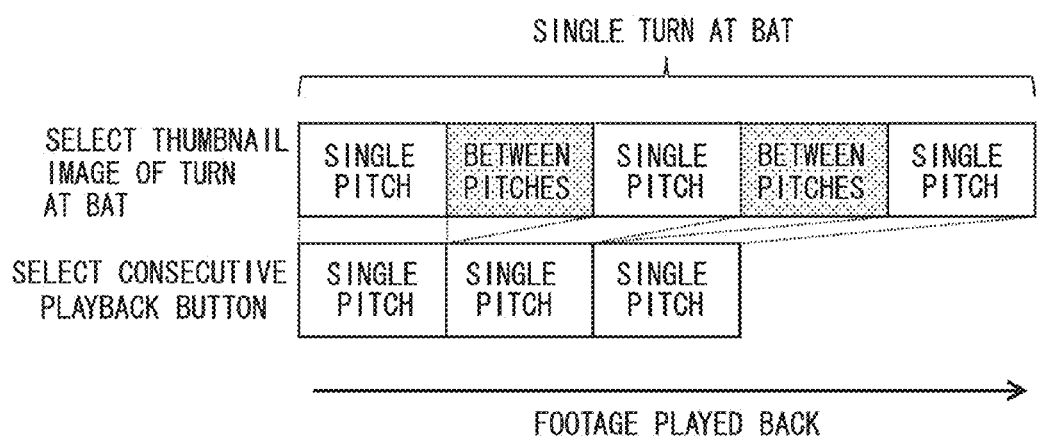
FIG. 21 is a drawing to explain variation in playback methods of footage of individual pitches.

For example, selected footage of an individual pitch may be played back so as to include footage from in-between pitches (for example footage from a scene in which the catcher returns the ball to the pitcher, or the like). Moreover, configuration may be made to consecutively play back footage of plural individual pitches included in selected footage of an individual turn at bat (footage from which footage in-between pitches has been removed). The user may also be allowed to select between the former playback method and the latter playback method. In such cases, for example as illustrated in FIG. 21, when a thumbnail image has been selected from the turn at bat selection region 75, footage of an individual turn at bat may be played back using the former playback method. Moreover, for example as illustrated in FIG. 20, when a consecutive playback button 79 has been selected, control may be performed such that the latter playback method is employed to consecutively play back footage of plural individual pitches included in the individual turn at bat. This thereby enables the user to select whether to select play back footage of a single pitch, or whether to consecutively play back pitching scenes within a turn at bat, as desired. Moreover, the user is able to select whether to extract and consecutively play back pitching scenes within a turn at bat, or whether to play back footage of a turn at bat including footage from in-between pitches, as desired.

Moreover, in cases in which plural thumbnail images have been selected from the turn at bat selection region 75, consecutive playback of footage of individual pitches may be applied for footage of plural individual pitches included in footage of plural individual turn at bats, similarly to as described above. Moreover, in cases in which consecutive playback of footage of individual pitches is not applied, footage of plural selected individual turn at bats may be played back consecutively, including footage from in-between pitches. When bookmarked footage has been designated as a search condition, configuration may be made such that bookmarked footage is played back consecutively, regardless of the selection state in the turn at bat selection region 75 and the pitch selection region 76, by selecting the consecutive playback button 79.

Figure 22:
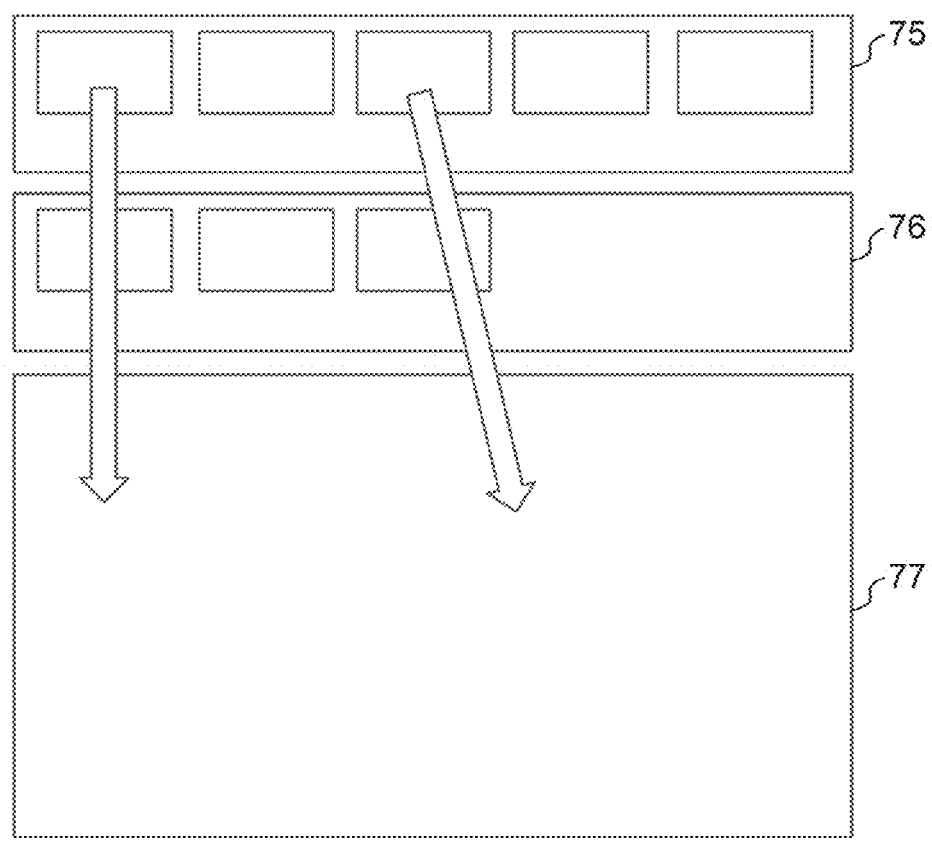
FIG. 22 is a drawing to explain playback of two pieces of footage.

In the exemplary embodiment described above, explanation has been given regarding a case in which a single piece of footage is played back in the playback region 77; however plural pieces of footage may be played back. For example, as illustrated in FIG. 22, configuration may be made such that two thumbnail images may be selected from the turn at bat selection region 75 or the pitch selection region 76, and dragged-and-dropped into the playback region 77. In such cases, control may be made to play back the two pieces of selected footage of an individual turn at bat or footage of an individual pitch side-by-side in the playback region 77.

In playback of plural pieces of footage in the playback region 77 as described above, control may be made to play back the plural pieces of footage with playback timings aligned at a point desired by the user. For example, as illustrated in FIG. 23, when playing back two pieces of footage in the playback region 77, slide bars 80 for selecting a reference point for synchronizing the timings, and marker buttons 81 for applying a marker at the reference point, are displayed corresponding to respective playback regions. Sliding the pointer of the slide bars 80 to the left or right displays the selected footage frame-by-frame. Selecting the marker buttons 81 applies a marker to the frame displayed in the playback region 77 at that point in time. When a playback button, not illustrated in the drawings, is selected to play back the two pieces of footage at the same time, the playback timing of the two pieces of footage is controlled such that the respective frames applied with the markers are displayed at the same timing. This thereby enables comparison between the actions of a player before, at, and after the moment the ball meets the bat in different turn at bats, by applying markers to the frame at the moment at which the ball meets the bat in the respective footage of two different individual turn at bats, and playing back the footage.

Explanation has been given regarding a case in which the footage provision program 60 that is an example of a program according to technology disclosed herein is pre-stored (installed) in the storage section 56; however there is no limitation thereto. The program according to technology disclosed herein may also be provided in a format recorded on a recording medium such as a CD-ROM, DVD-ROM, USB memory, or the like.

One aspect of technology disclosed herein exhibits the advantageous effect of enabling improved locatability of a desired scene in captured footage of a baseball game.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A footage extraction method comprising:
   extracting baseball footage of a batter's turn at bat or a pitcher's pitch matching a designated condition from a baseball footage including a plurality of frames, and a frame time or a frame number of a frame indicating demarcation of bat footage of the batter's turn at bat corresponding to meta information relating to the turn at bat and the frame time or the frame number of the frame indicating demarcation of pitch footage of the pitcher's pitch corresponding to meta information relating to the pitch, the meta information relating to the pitcher's pitch including information indicating a ball count and the meta information relating to the batter's turn at bat including information indicating a ball count change trend from an initial status of a ball count to a particular ball count status and whether the batter's turn at bat has a strike advantage or a ball advantage,
   receiving a designation including the particular ball count status and the ball count change trend; and
   when extracting footage of a batter's turn at bat or a pitcher's pitch from the baseball footage, extracting, by a processor, pitch footage demarcated by the frame included in the bat footage of the batter's turn at bat corresponding to meta information indicating the designated ball count change trend and corresponding to meta information indicating the designated particular ball count status.

2. The footage extraction method of claim 1, wherein the designation further includes a designation of whether or not a batter's team corresponding to a turn at bat having the particular ball count status is leading in points with respect to a pitcher's team corresponding to the turn at bat.

3. The footage extraction method of claim 1, wherein the designation further includes a designation of a batting order corresponding to a turn at bat having the particular ball count status.

4. The footage extraction method of claim 1, wherein the designation further includes a designation of whether or not a runner gained a base as an outcome of a turn at bat having the particular ball count status.

5. The footage extraction method of claim 1, wherein the designation further includes a designation of a position where the ball was hit, a type of pitch, or a combination thereof, for the particular ball count status.

6. The footage extraction method of claim 1, wherein the information relating to the turn at bat further includes information indicating whether or not a batter's team corresponding to the turn at bat is leading in points with respect to a pitcher's team corresponding to the turn at bat, the footage extraction method further comprising:

by a processor, extracting, from the baseball footage, turn at bat footage appended with information indicating pitch footage included in the designated ball count change trend and information indicating a designation of whether or not the batter's team corresponding to the turn at bat is leading in points with respect to the pitcher's team corresponding to the turn at bat, and that corresponds to pitch footage appended with the designated particular ball count status.

7. The footage extraction method of claim 1, wherein the information relating to the turn at bat further includes information of a batting order, the footage extraction method further comprising:

by a processor, extracting, from the baseball footage, turn at bat footage appended with information indicating pitch footage included in the designated ball count change trend and information indicating the designated the batting order, and that corresponds to pitch footage appended with the designated particular ball count status.

8. A footage extraction method comprising:

extracting, from a baseball footage including a plurality of frames, a frame time or a frame number of a frame indicating demarcation of bat footage of a batter's turn at bat corresponding to meta information relating to the batter's turn at bat and the frame time or the frame number of the frame indicating demarcation of pitch footage of a pitcher's pitch corresponding to meta information relating to the pitcher's pitch, and footage of one turn at bat or a plurality of turns at bat demarcated by the frame corresponding to the meta information corresponding to the designated search condition;

in displaying one thumbnail image or a plurality of thumbnail images corresponding to footage of one turn at bat or a plurality of turns at bat extracted, associating, by a processor, as a total number of pitches within a turn at bat, a number of pieces of pitching footage demarcated by the frame that is included in the turn at bat footage corresponding to the one thumbnail image or the plurality of thumbnail images and that indicates demarcation of pitch footage of each pitcher's pitch, with the one thumbnail image or each of the plurality of thumbnail images, and displaying the total number of pitches with the one or the plurality of thumbnail images.

9. The footage extraction method of claim 8, further comprising:

when the one displayed thumbnail image or any of the plurality of displayed thumbnail images has been selected, displaying on a display section one or more pitching scene images respectively corresponding to one or more pieces of pitching scene footage included in a turn at bat corresponding to the selected thumbnail image; and when any of the one or more displayed pitching scene images has been selected, playing back on the display section pitching scene footage corresponding to the selected pitching scene image.

10. The footage extraction method of claim 9, wherein in displaying the one or more pitching scene images, a ball count status for a pitching scene corresponding to one or more pitching scene images is associated with the respective displayed pitching scene images and is displayed with the respective displayed pitching scene images on the display section.

11. The footage extraction method of claim 9, wherein in displaying the one or more pitching scene images, a display mode for the one or more respective pitching scene images is varied according to whether a pitch of a pitching scene corresponding to the one or more respective pitching scene images is a strike, or is a ball.

12. The footage extraction method of claim 9, wherein in playing back the pitching scene footage, one or more pieces of footage corresponding to the one or more displayed pitching scene images are played back consecutively on the display section.

13. The footage extraction method of claim 9, further comprising:

receiving a designation to mark the respective one or more pitching scene images corresponding to the one or more pitching scenes included in a plurality of different turn at bats; and when a request has been received to playback pitching scene footage corresponding to the pitching scene images that have been designated by the mark, consecutively playing back on the display section pitching scene footage corresponding to the pitching scene images that have been designated by the mark.

14. The footage extraction method of claim 9, wherein in playing back the pitching scene footage, a selection is received as to whether to play back one or more pieces of footage corresponding to the one or more displayed pitching scene images consecutively on the display section, or whether to play back footage of a selected turn at bat from beginning to end, and, according to the selection outcome, the one or more pieces of footage are played back consecutively, or footage of the selected turn at bat is played back from beginning to end.

15. The footage extraction method of claim 9, wherein in displaying the one or more pitching scene images, a display mode for the one thumbnail image or each of the plurality of thumbnail images is varied according to whether the outcome of the turn at bat corresponding to the one extracted thumbnail image or each of the plurality of extracted thumbnail images was "out" or "safe".

16. The footage extraction method of claim 9, wherein in displaying the one or more pitching scene images, information representing a turn at bat outcome corresponding to the one thumbnail image or each of the plurality of thumbnail images that have been extracted is associated with the extracted one thumbnail image or the plurality of thumbnail images, and displayed with the extracted one thumbnail image or the plurality of thumbnail images on the display section.

17. The footage extraction method of claim 9, wherein
in displaying the one or more pitching scene images, in cases in which there are a plurality of the extracted thumbnail images, a total number of turn at bat outcomes of "out" and a total number of turn at bat outcomes of "safe" that correspond to the plurality of respective thumbnail images are displayed on the display section.

18. The footage extraction method of claim 9, wherein
in playing back the pitching scene footage, information representing a pitching scene situation corresponding to the pitching scene footage that is being played back is displayed overlaid on the pitching scene footage; and
the information representing the situation includes at least one piece of information corresponding to the pitching scene footage that is being played back selected from the group consisting of a score of a batter's team and a score of a pitcher's team, information representing a runner-on-base situation, a ball count status, and an out count.

19. The footage extraction method of claim 8, further comprising:
displaying on a display section one turn at bat thumbnail image or a plurality of turn at bat thumbnail images respectively corresponding to one piece of turn at bat footage or a plurality of pieces of turn at bat footage extracted according to a search condition from baseball footage in which footage of each turn at bat is appended with information relating to the turn at bat and footage of each pitcher's pitch is appended with information relating to the pitch;
when the one displayed turn at bat thumbnail image or any of the plurality of displayed turn at bat thumbnail images has been selected, displaying on the display section one or more pitching thumbnail images respectively corresponding to one or more pieces of pitching footage included in a turn at bat corresponding to the selected turn at bat thumbnail image; and
when any of the one or more displayed pitching thumbnail images has been selected, playing back on the display section pitching footage corresponding to the selected pitching scene thumbnail image.

20. The footage extraction method of claim 8, further comprising:
displaying on a display section one turn at bat thumbnail image or a plurality of turn at bat thumbnail images respectively corresponding to one piece of turn at bat footage or a plurality of pieces of turn at bat footage extracted according to a search condition from baseball footage in which footage of each turn at bat is appended with information relating to the turn at bat and footage of each pitcher's pitch is appended with information relating to the pitch;
when the one displayed turn at bat thumbnail image or any of the plurality of displayed turn at bat thumbnail images has been selected, displaying on the display section one or more pitching thumbnail images respectively corresponding to one or more pieces of pitching footage included in a turn at bat corresponding to the selected turn at bat thumbnail image;
when any of the one or more displayed pitching thumbnail images has been selected, playing back on the display section pitching footage corresponding to the selected pitching scene thumbnail image; and
when a plurality of pitching thumbnail images has been selected from the one or more pitching thumbnail images, consecutively playing back on the display section a plurality of pieces of pitching footage corresponding to the selected plurality of pitching thumbnail images.

21. The footage extraction method of claim 8, further comprising:
displaying on a display section one turn at bat thumbnail image or a plurality of turn at bat thumbnail images respectively corresponding to one piece of turn at bat footage or a plurality of pieces of turn at bat footage extracted according to a search condition from baseball footage in which footage of each turn at bat is appended with information relating to the turn at bat and footage of each pitcher's pitch is appended with information relating to the pitch;
when the one displayed turn at bat thumbnail image or any of the plurality of displayed turn at bat thumbnail images has been selected, displaying on the display section one or more pitching thumbnail images respectively corresponding to one or more pieces of pitching footage included in a turn at bat corresponding to the selected turn at bat thumbnail image;
when any of the one or more displayed pitching thumbnail images has been selected, playing back on the display section pitching footage corresponding to the selected pitching scene thumbnail image;
when a plurality of pitching thumbnail images has been selected from the one or more pitching thumbnail images, receiving a designation of a frame for each of a plurality of pieces pitching footage respectively corresponding to the selected plurality of pitching thumbnail images; and
adjusting a playback timing of the plurality of pieces of pitching footage such that each designated frame is played back at the same timing.

* * * * *